United States Patent
Moriguchi et al.

(10) Patent No.: US 10,296,468 B2
(45) Date of Patent: May 21, 2019

(54) STORAGE SYSTEM AND CACHE CONTROL APPARATUS FOR STORAGE SYSTEM

(71) Applicant: Hitachi, Ltd., Tokyo (JP)

(72) Inventors: Mioko Moriguchi, Tokyo (JP); Wataru Okada, Tokyo (JP); Nobuhiro Maki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 397 days.

(21) Appl. No.: 15/039,967

(22) PCT Filed: Feb. 5, 2014

(86) PCT No.: PCT/JP2014/052637
§ 371 (c)(1),
(2) Date: May 27, 2016

(87) PCT Pub. No.: WO2015/118630
PCT Pub. Date: Aug. 13, 2015

(65) Prior Publication Data
US 2017/0139842 A1    May 18, 2017

(51) Int. Cl.
G06F 21/78    (2013.01)
G06F 12/14    (2006.01)
(Continued)

(52) U.S. Cl.
CPC ...... *G06F 12/1408* (2013.01); *G06F 12/0802* (2013.01); *G06F 12/0875* (2013.01);
(Continued)

(58) Field of Classification Search
CPC .................................................. G06F 21/78
See application file for complete search history.

(56) References Cited

U.S. PATENT DOCUMENTS 6,457,126 B1 * 9/2002 Nakamura .............. G06F 21/79
380/277
8,098,824 B2    1/2012 Mikami et al.
(Continued)

FOREIGN PATENT DOCUMENTS

JP    2002-268946 A    9/2002
JP    2009-064178 A    3/2009
JP    2010-009306 A    1/2010

OTHER PUBLICATIONS

International Search Report of PCT/JP2014/052637 dated Apr. 28, 2014.

*Primary Examiner* — Josnel Jeudy
(74) *Attorney, Agent, or Firm* — Mattingly & Malur, PC

(57) ABSTRACT

An encryption key used with a storing apparatus and an encryption key used with a non-volatile cache memory are identical to each other. A cache control portion unit effects control in such a way that an encryption key EK used to encrypt first data stored in the storing apparatuses, and an encryption key EK used to encrypt second data which are data corresponding to the first data and are stored in the non-volatile cache memory, are identical to each other. If the cache control portion receives a write request and first data WD, the cache control portion identifies from the storing apparatuses a storing apparatus that is to be the storage destination of the first data, identifies an encryption key allocated to the identified storing apparatus, encrypts the second data corresponding to the first data using the identified encryption key, and stores the data in the non-volatile cache memory.

20 Claims, 19 Drawing Sheets

(51) Int. Cl.
  *H04L 9/08*       (2006.01)
  *G06F 12/0802*    (2016.01)
  *G06F 12/0875*    (2016.01)

(52) U.S. Cl.
  CPC .......... *G06F 12/1466* (2013.01); *G06F 21/78* (2013.01); *H04L 9/0894* (2013.01); *G06F 2212/1052* (2013.01); *G06F 2212/222* (2013.01); *G06F 2212/402* (2013.01); *G06F 2212/60* (2013.01); *G06F 2221/2107* (2013.01)

(56) References Cited

U.S. PATENT DOCUMENTS

| | | | |
|---|---|---|---|
| 8,131,930 B1 | 3/2012 | Clark et al. | |
| 8,886,963 B2* | 11/2014 | Sauerwald | G06F 21/6218 707/693 |
| 2003/0046238 A1* | 3/2003 | Nonaka | G06F 21/10 705/51 |
| 2003/0182566 A1 | 9/2003 | Kohara et al. | |
| 2007/0016719 A1* | 1/2007 | Ono | G06F 12/0804 711/103 |
| 2008/0034440 A1* | 2/2008 | Holtzman | G06F 21/10 726/27 |
| 2008/0082835 A1* | 4/2008 | Asher | G06F 21/78 713/193 |
| 2009/0327758 A1 | 12/2009 | Sakanaka et al. | |
| 2011/0016317 A1* | 1/2011 | Abe | H04L 9/0897 713/169 |
| 2012/0317382 A1* | 12/2012 | Steed | G06F 11/1441 711/162 |

\* cited by examiner

【Fig. 1】
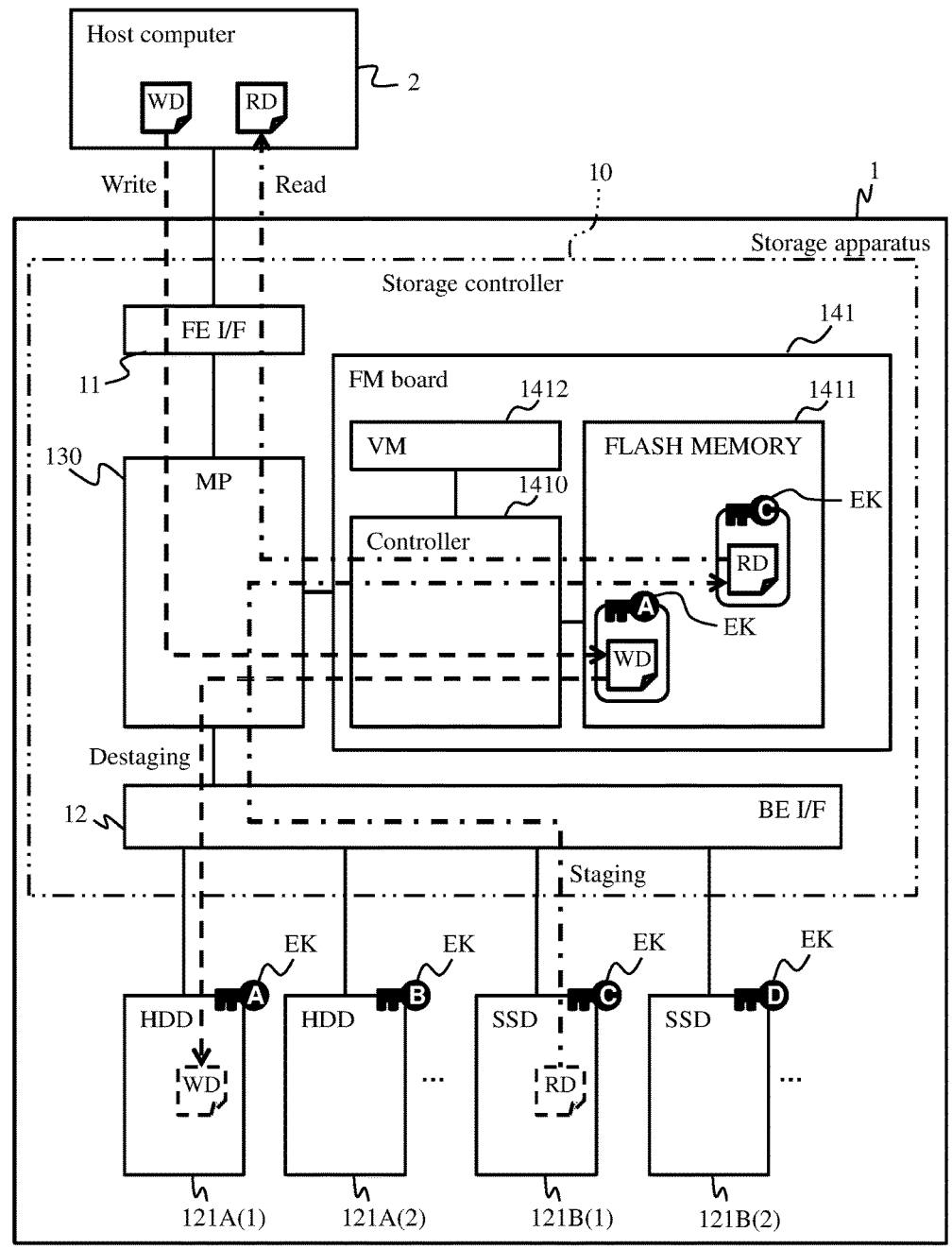

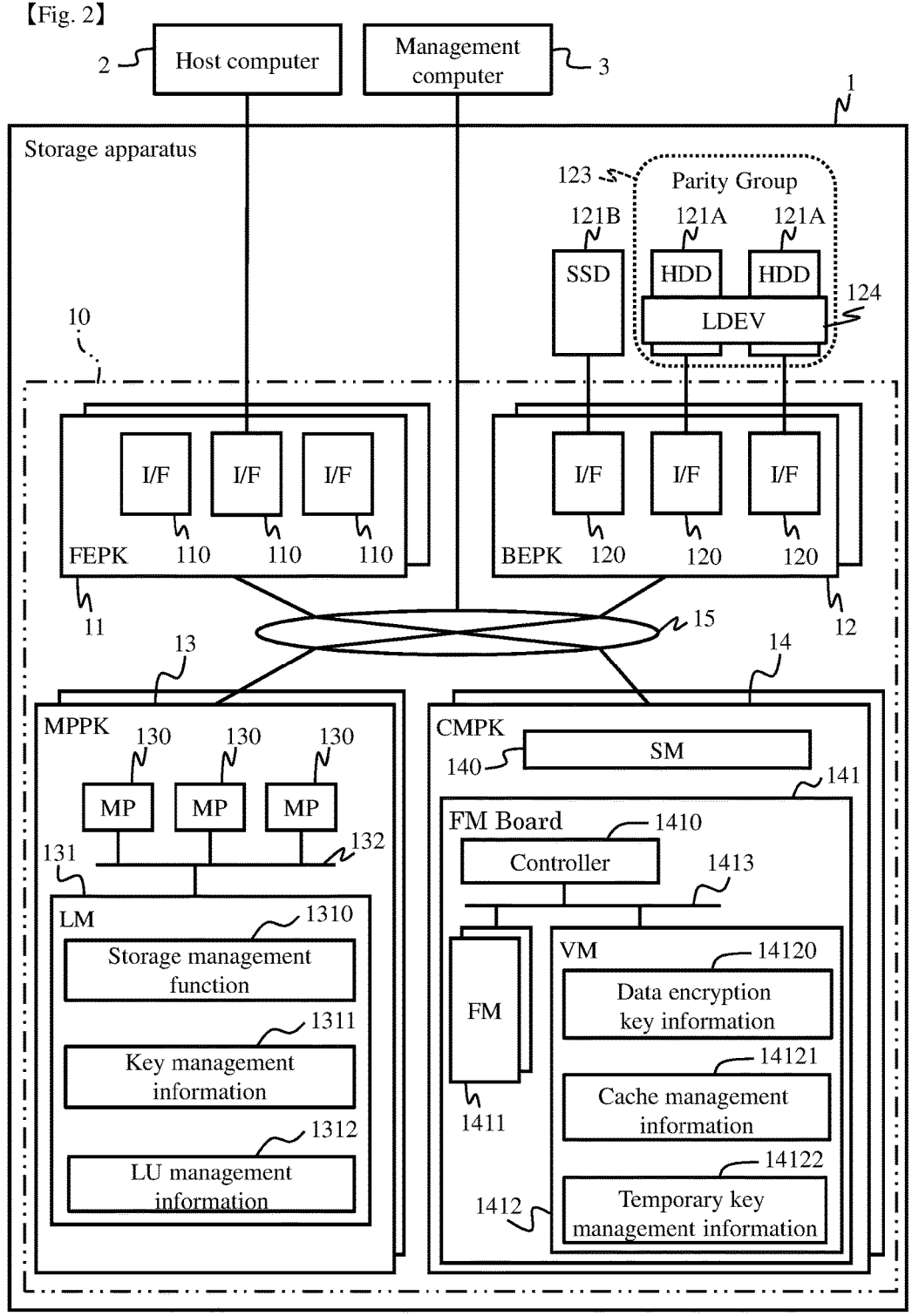

【Fig. 3】

| KEY ID | KEY | Storing apparatus ID | Cache in-use flag |
|---|---|---|---|
| TMP_Key_001 | 321BF2F790019DCC | none | TRUE |
| ... | ... | ... | ... |
| Key_001 | 4A60FD38F8038DC2 | PDEV_001 | TRUE |
| Key_002 | DA143D76EE24882D | PDEV_002 | FALSE |
| ... | ... | ... | ... |

[Fig. 4]

| LUN | LDEV attribute | LBA Range | | Storing apparatus ID | LBA Range | |
|---|---|---|---|---|---|---|
| | | start | end | | start | end |
| LU_001 | V-VOL | 0 | 19 | PDEV_001 | 80 | 99 |
| | | 20 | 39 | | 6930 | 6949 |
| | | 40 | 59 | PDEV_003 | 420 | 439 |
| | | 60 | 79 | | 570 | 589 |
| LU_002 | DP-VOL | 0 | 9 | PDEV_004 | 1000 | 1009 |
| | | 10 | 19 | | 1010 | 1019 |
| | | 20 | 29 | | 2110 | 2119 |
| ... | ... | ... | ... | ... | ... | ... |

1312, 1312a, 1312b, 1312c, 1312f, 1312g, 1312d, 1312e, 1312h, 1312i

[Fig. 5]
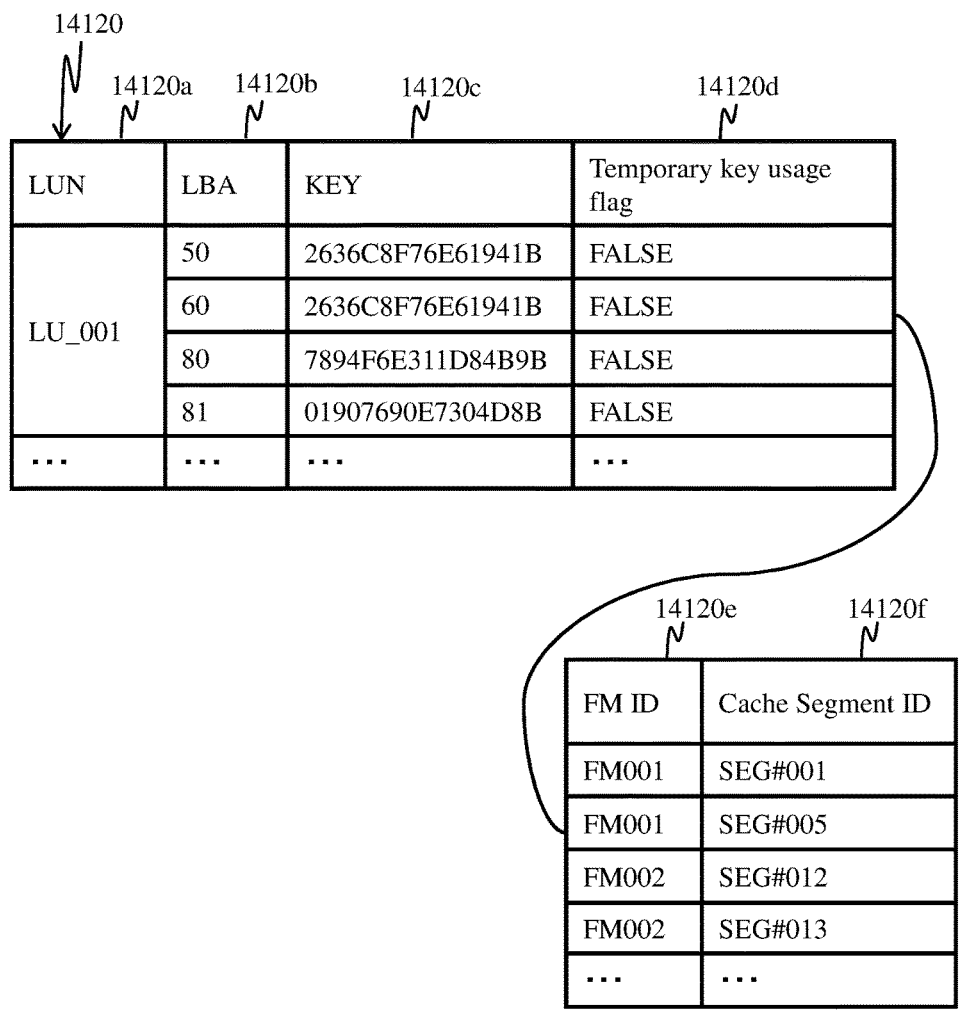

[Fig. 6]
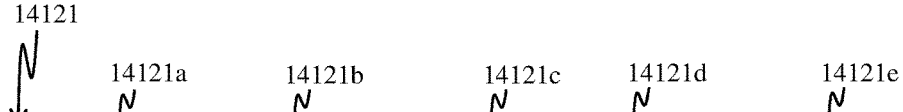
[Fig. 7]
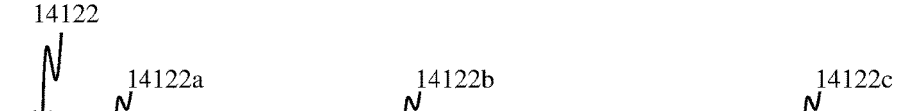

[Fig. 8]
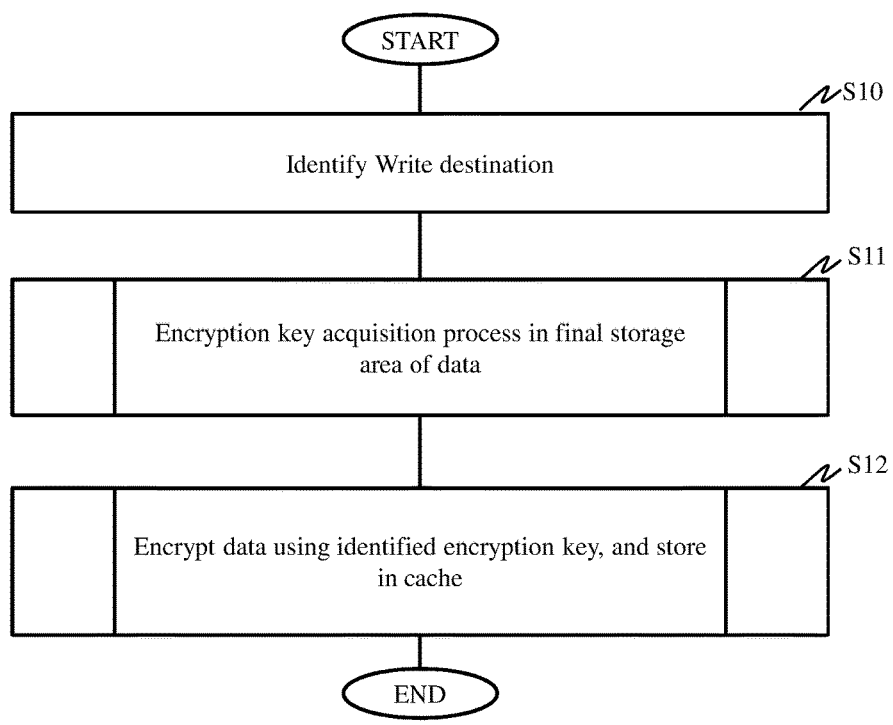

[Fig. 9]
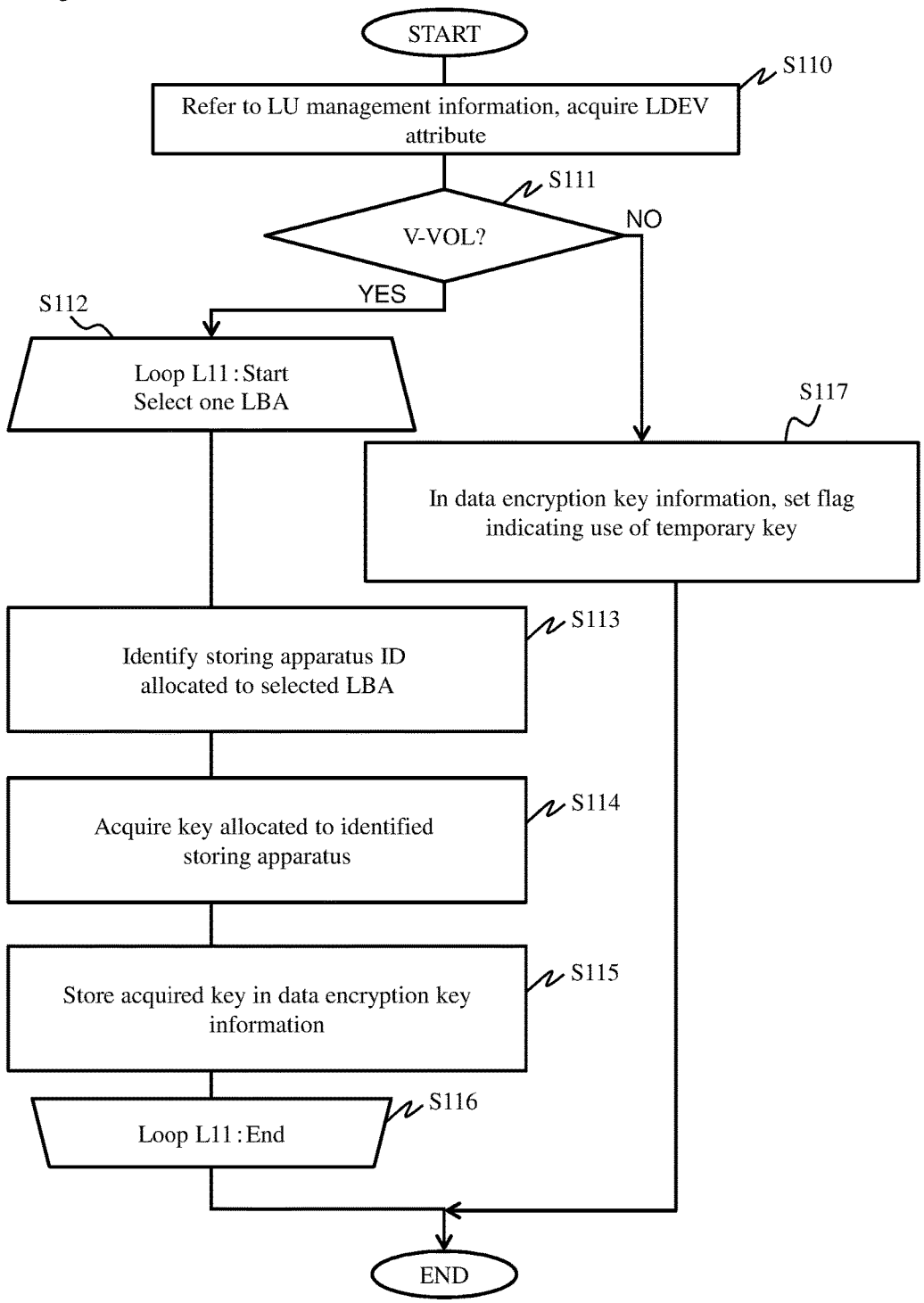

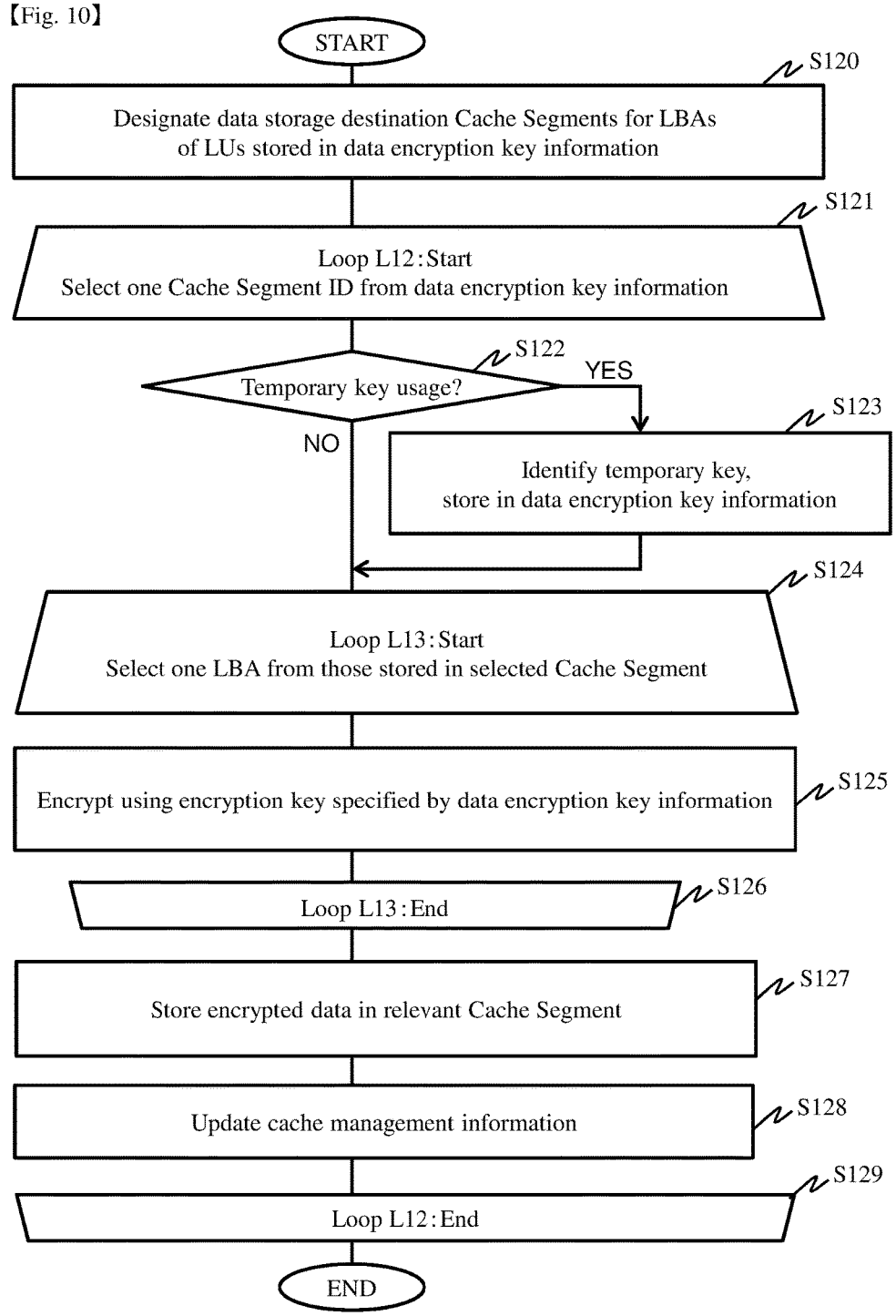
[Fig. 10]

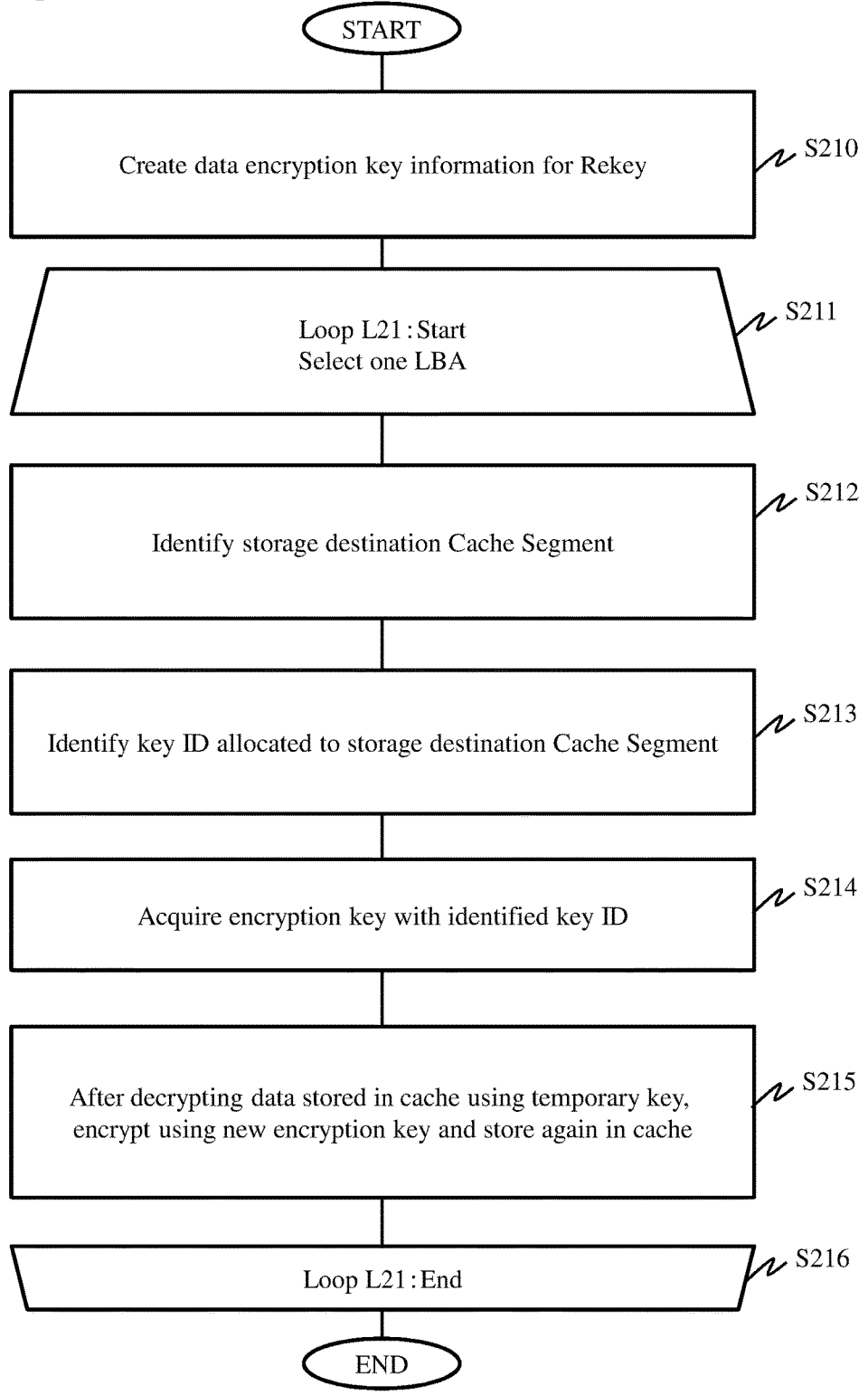
[Fig. 11]

【Fig. 12】
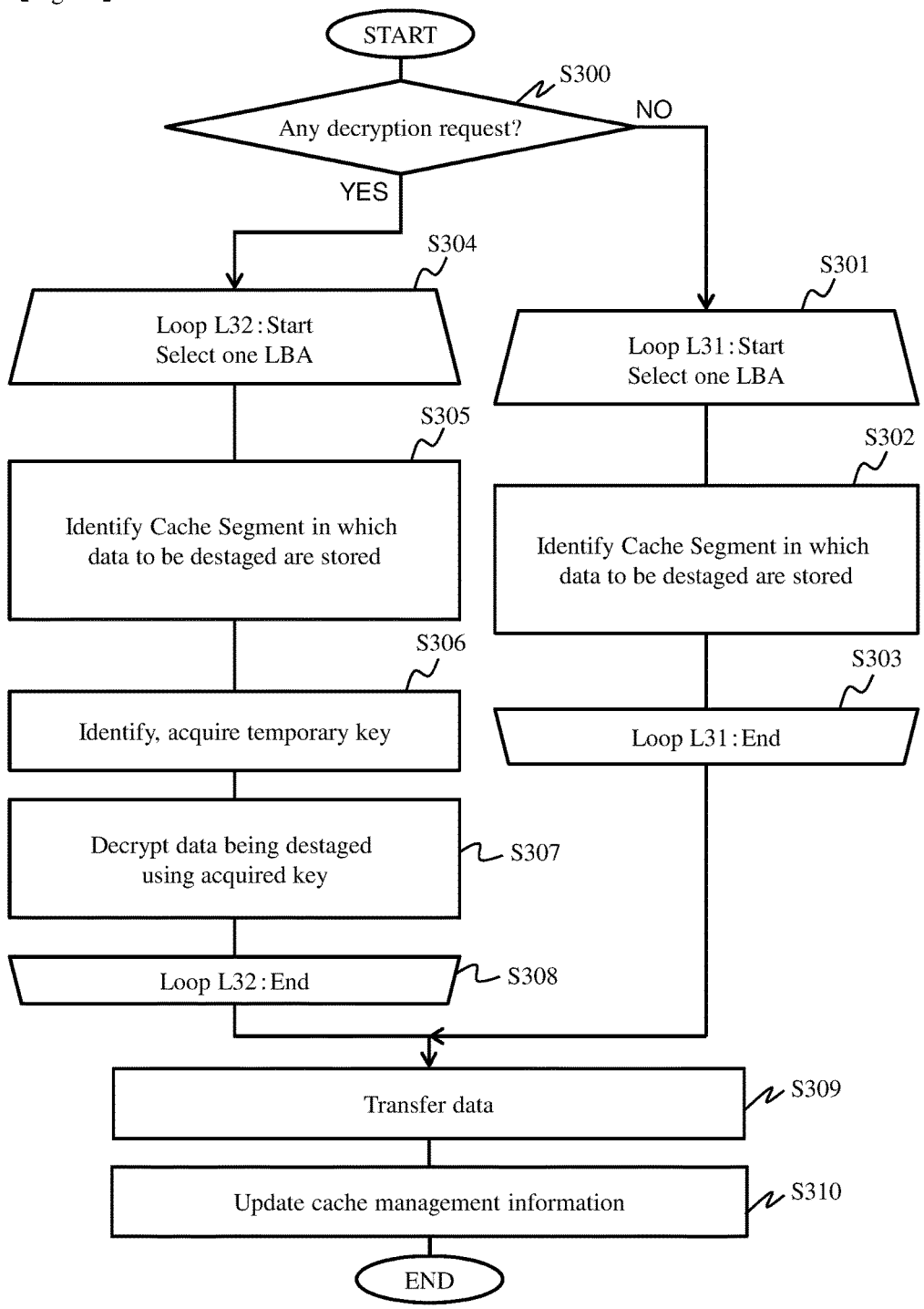

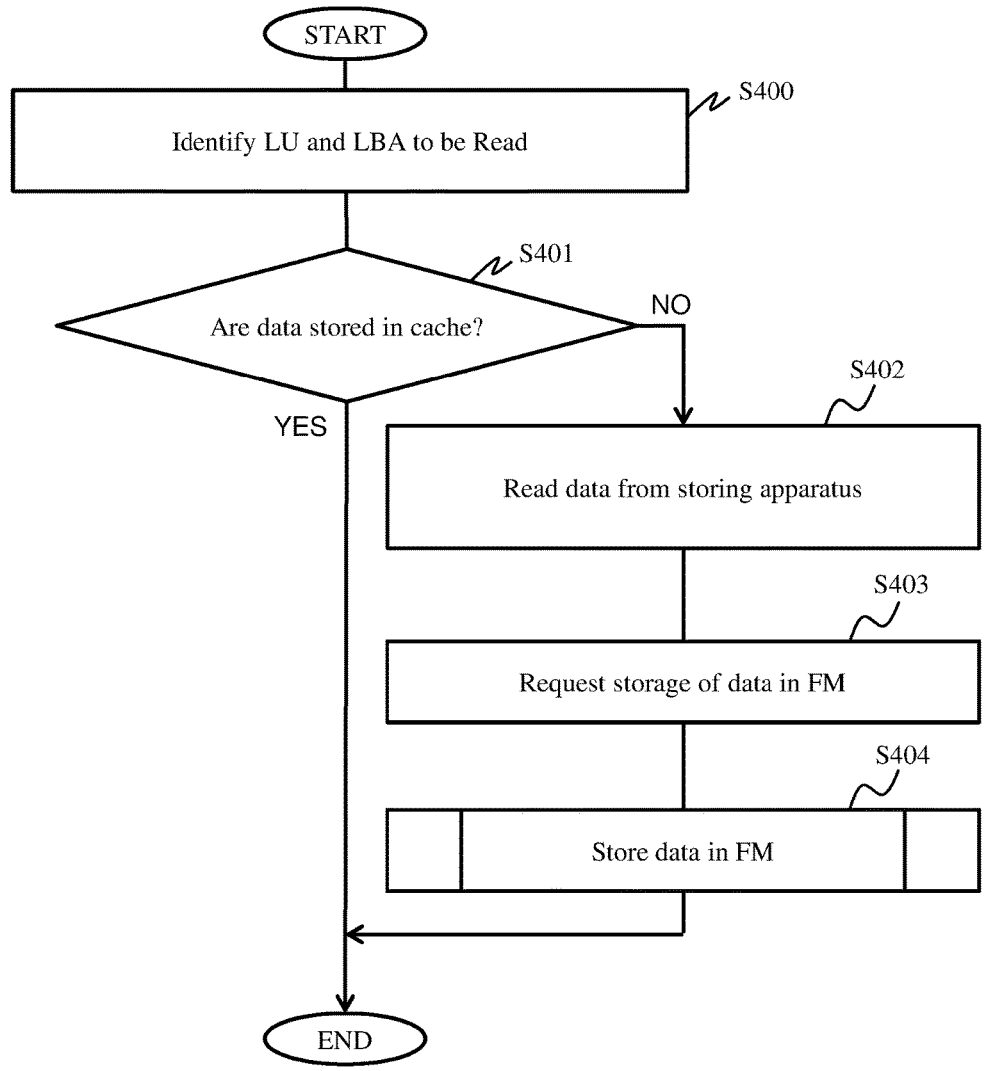
[Fig. 13]

[Fig. 14]
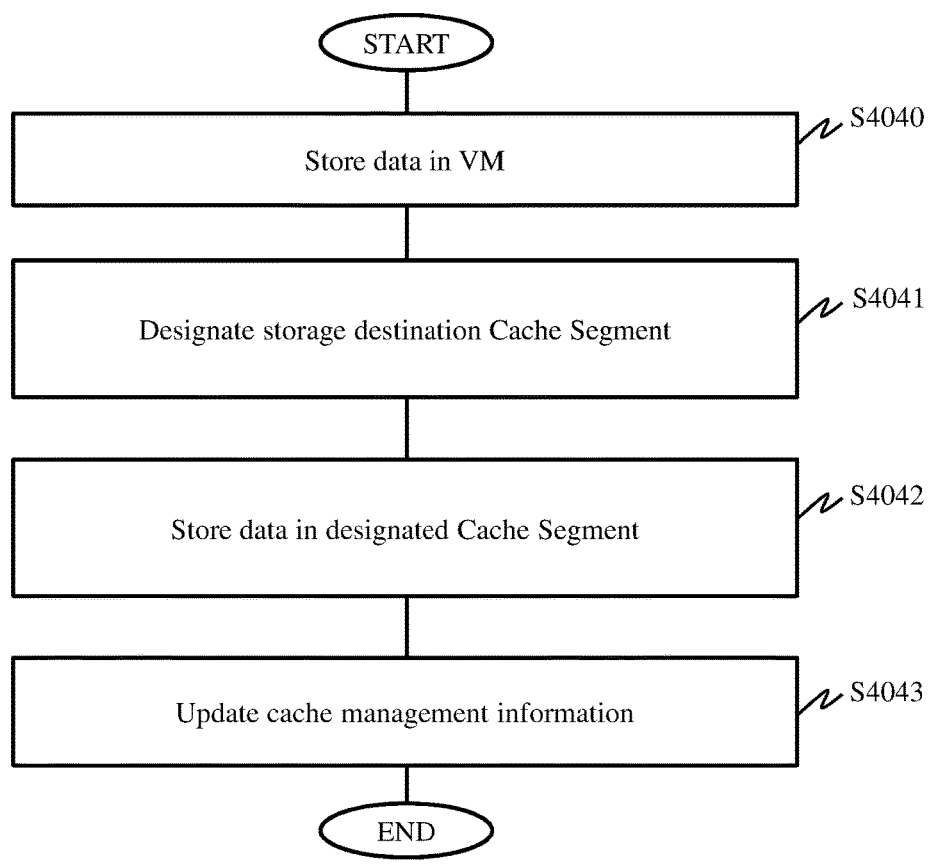

【Fig. 15】
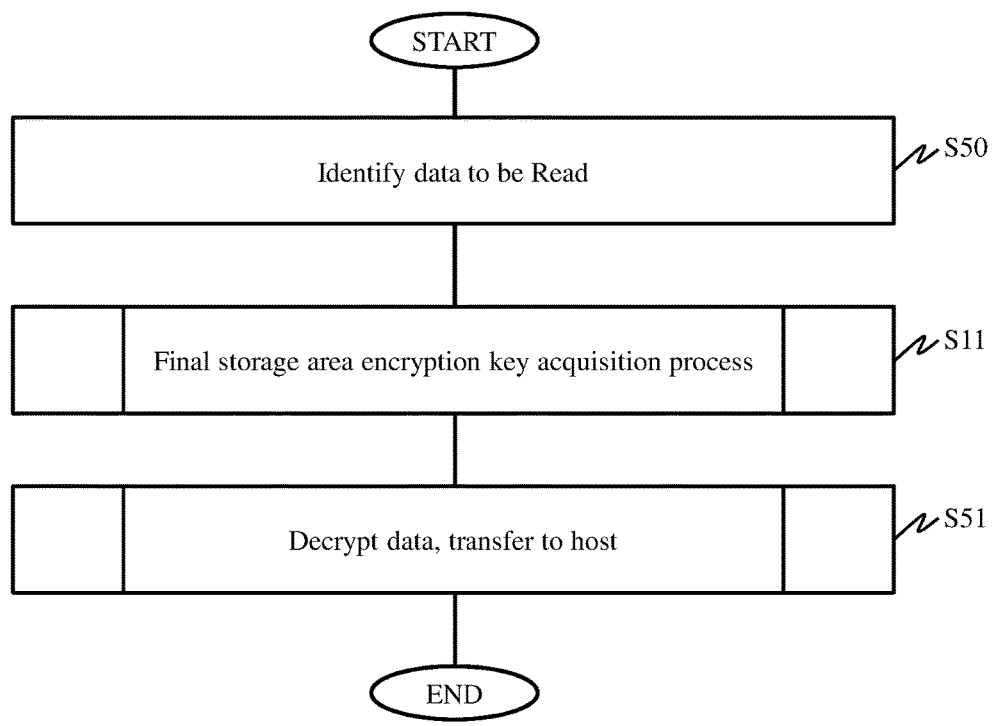

【Fig. 16】
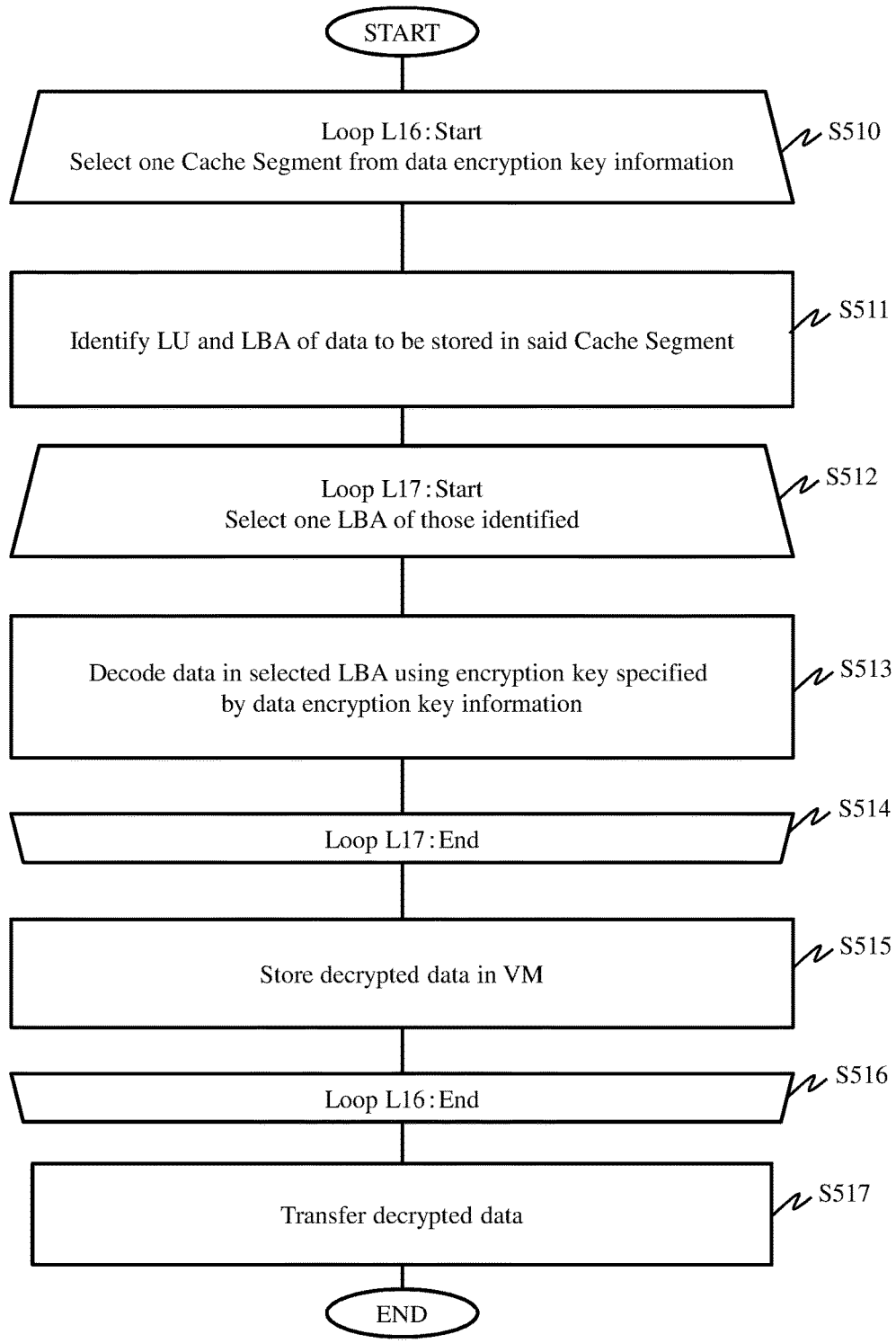

【Fig. 17】
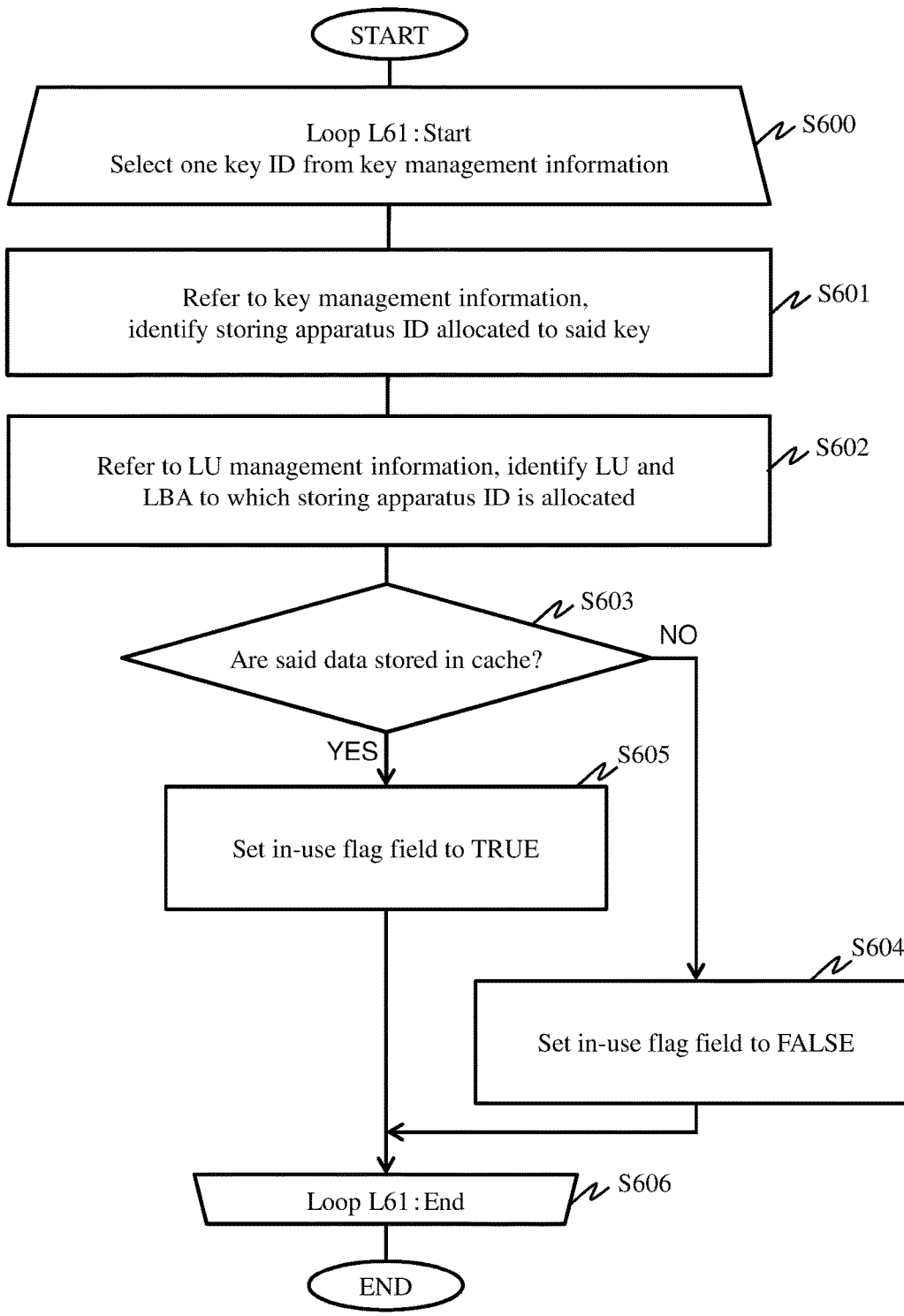

[Fig. 18]

| LUN | LBA Range | | KEY ID | Fixed flag |
|---|---|---|---|---|
| | start | end | | |
| LU_001 | 80 | 99 | Key_001 | FALSE |
| LU_001 | 20 | 39 | Key_001 | FALSE |
| LU_003 | 100 | 129 | Key_002 | TRUE |
| ... | ... | ... | ... | ... |

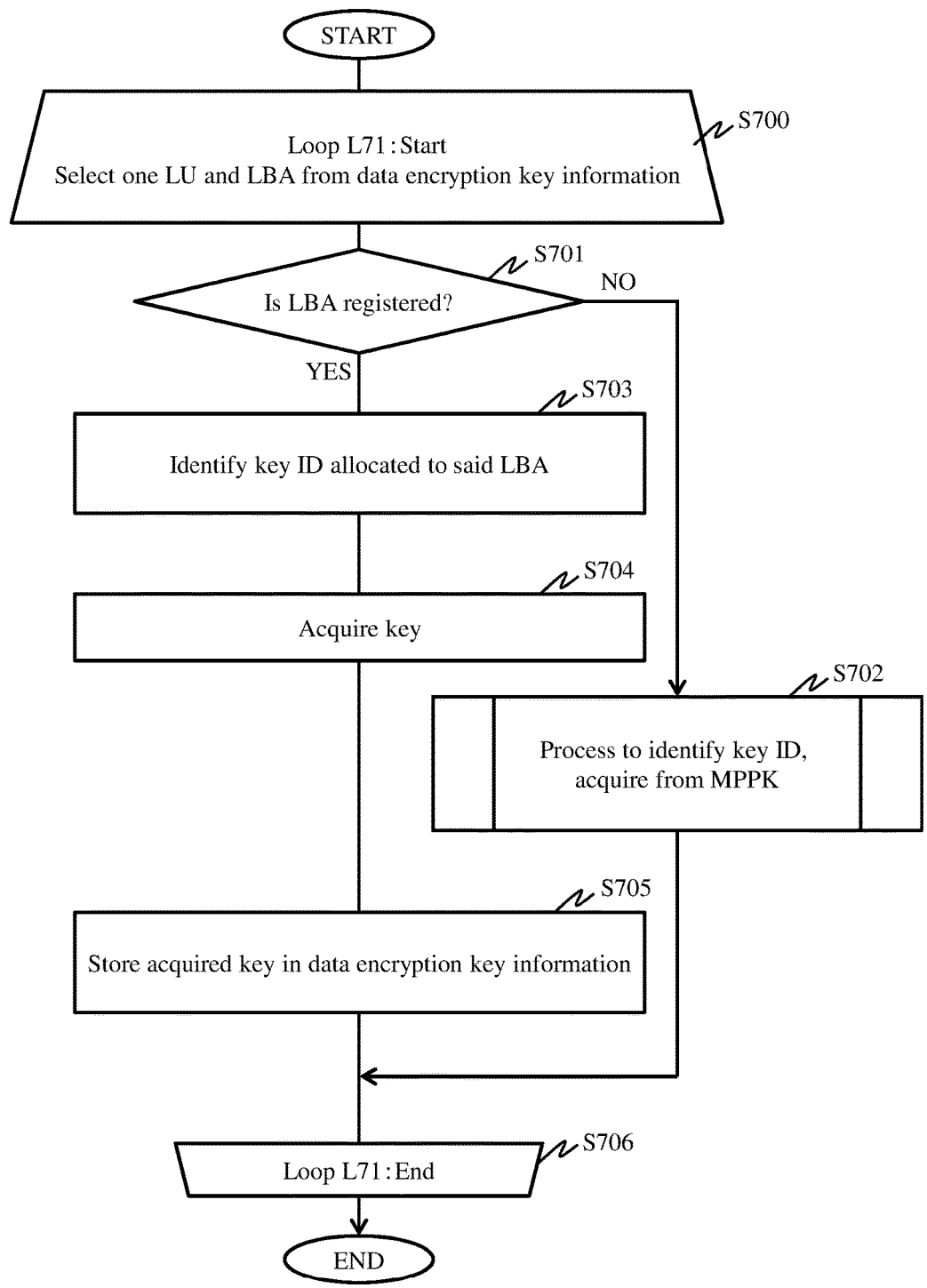
[Fig. 19]

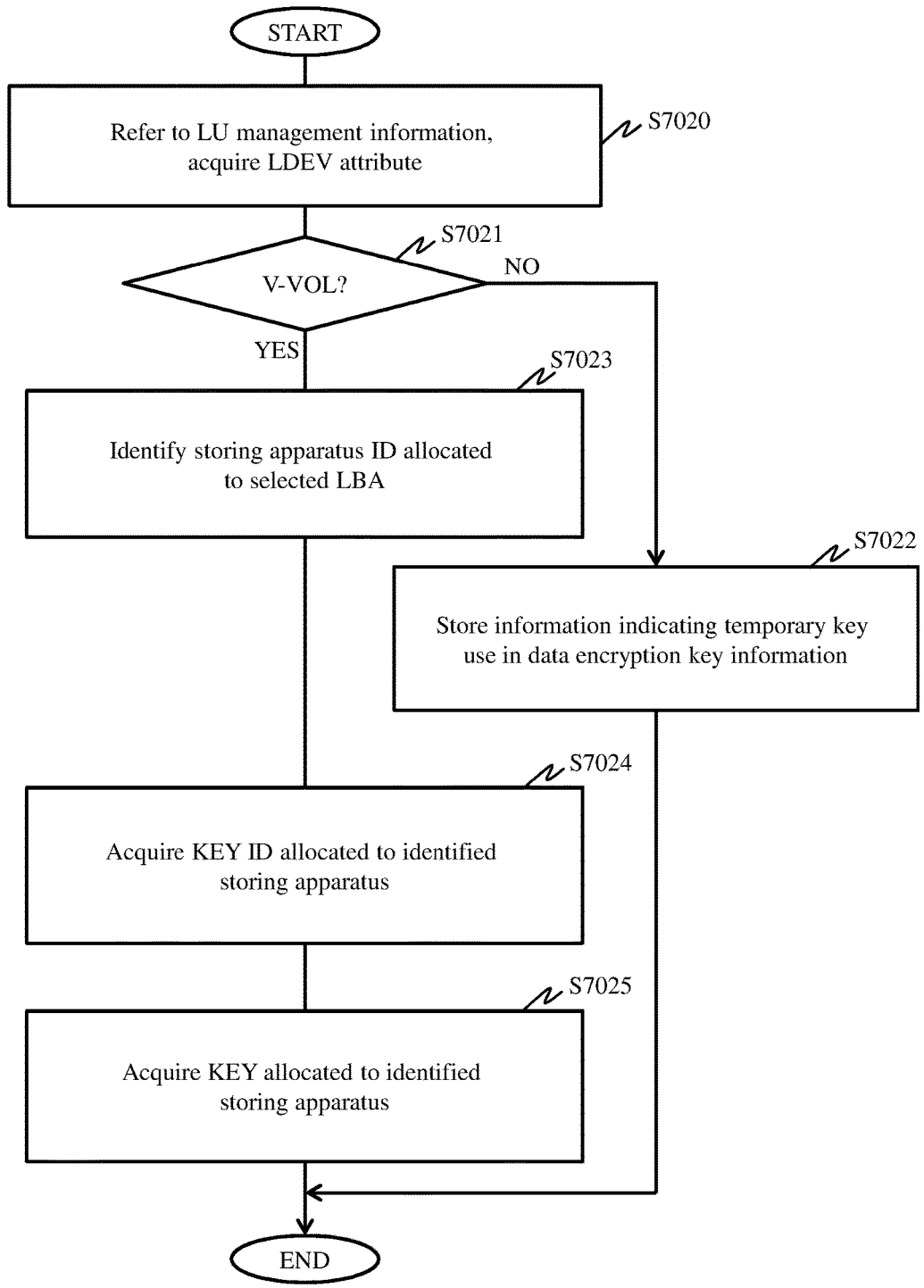
[Fig. 20]

STORAGE SYSTEM AND CACHE CONTROL APPARATUS FOR STORAGE SYSTEM

TECHNICAL FIELD

The present invention relates to a storage system and a cache control apparatus for a storage system.

BACKGROUND ART

U.S. Pat. No. 8,131,930 discloses a technique in which a SSD (Solid State Drive) is installed instead of a HDD (Hard Disk Drive), and a portion of the SSD is used as a cache. By configuring a large capacity cache using non-volatile memory, the power consumption of the cache can be reduced. On the other hand, in the event that a cache configured using non-volatile memory is stolen or lost, there is a danger of data leakage.

Accordingly, methods of encrypting data stored in a cache configured using non-volatile memory have been proposed (PTL 2). Data can in this way be encrypted and stored in non-volatile memory used as a cache, and thus the data can be protected.

CITATION LIST

Patent Literature

[PTL 1]
U.S. Pat. No. 8,131,930 (Specification)
[PTL 2]
Japanese Patent Application Publication No. 2010-009306

SUMMARY OF INVENTION

Technical Problem

In the prior art, an encryption key used with data stored in a cache and an encryption key used when storing in a storing apparatus, which is the final storage location of the data, are different, and it is therefore not possible to maintain the same security level for the data.

The present invention takes account of the abovementioned problem, and its object is to provide a storage system and a cache control apparatus for a storage system configured such that a security level can be maintained by effecting control such that an encryption key used in a storing apparatus and an encryption key used in non-volatile cache memory are identical to each other.

Solution to Problem

The storage system according to one aspect of the present invention is a storage system comprising a storage controller and a plurality of storing apparatuses controlled by the storage controller, characterized in that the storage controller includes a cache control portion which controls a non-volatile cache memory, and in that the cache control portion effects control in such a way that an encryption key used to encrypt first data stored in the storing apparatuses, and an encryption key used to encrypt second data which correspond to the first data and are stored in the non-volatile cache memory, are identical to each other.

Advantageous Effects of Invention

According to the present invention, it is possible to effect control in such a way that the encryption key used to encrypt the first data stored in each storing apparatus and the encryption key used to encrypt the second data stored in the non-volatile cache memory are identical to each other.

BRIEF DESCRIPTION OF DRAWINGS

FIG. 1 is a block diagram illustrating in outline the overall configuration of a storage system according to the present embodiment.
FIG. 2 is a block diagram illustrating the configuration of a storage apparatus.
FIG. 3 is a table illustrating an example of the configuration of key management information.
FIG. 4 is a table illustrating an example of the configuration of LU management information.
FIG. 5 is a table illustrating an example of the configuration of data encryption key information.
FIG. 6 is a table illustrating an example of the configuration of cache management information.
FIG. 7 is a table illustrating an example of the configuration of temporary key management information.
FIG. 8 is a flowchart of a write process.
FIG. 9 is a flowchart illustrating the details of one step in FIG. 8.
FIG. 10 is a flowchart illustrating the details of another step in FIG. 8.
FIG. 11 is a flowchart illustrating a process performed in a situation in which an encryption key is designated prior to destaging.
FIG. 12 is a flowchart of a destaging process.
FIG. 13 is a flowchart of a staging process.
FIG. 14 is a flowchart illustrating the details of one step in FIG. 13.
FIG. 15 is a flowchart of a read process.
FIG. 16 is a flowchart illustrating the details of one step in FIG. 15.
FIG. 17 is a flowchart illustrating a process for determining whether or not it is an encryption key used for encrypting cache data, according to a second embodiment.
FIG. 18 is a table illustrating an example of the configuration of cache management information, according to a third embodiment.
FIG. 19 is a flowchart illustrating a process performed to identify a key used for encrypting data.
FIG. 20 is a flowchart illustrating the details of one step in FIG. 19.

DESCRIPTION OF EMBODIMENTS

Modes of embodiment will now be described with reference to the drawings. It should be noted that in the following explanation, various types of information are in some cases described using expressions such as 'management table', but the various types of information may also be expressed using data structures other than tables. Further, to indicate that there is no dependence on the data structure, 'management table' can be referred to as 'management information'.

Also, processes are in some cases described taking 'program' as the subject. The program is executed by a processor, for example a CPU (Central Processing Unit), and it performs defined processes. It should be noted that these are performed while making appropriate use of storage resources (for example memory) and communications interface apparatuses (for example communication ports), and therefore the subject of the process may also be deemed to be the processor. A processor may comprise dedicated hardware instead of a CPU. A computer program may be installed into each computer from a program source. A program source may for example be offered using a program distribution host computer, a storage medium or the like.

Further, each element can be identified using a number or the like, but other types of identification information such as names may also be used provided that they constitute information making identification possible. In the drawings and description of the embodiments, identical reference codes are assigned to identical parts, but the present invention is not limited to these embodiments, and all application examples which conform to the concept of the present invention are included in the technical scope of the present invention. Further, unless otherwise specifically limited, each constituent element may be plural or singular.

In the present mode of embodiment, by means of a controller 1410 which controls a non-volatile cache memory 1411, data stored in the non-volatile cache memory 1411 are encrypted in conjunction with a stored data encryption process which is offered as an existing function by a storage apparatus 1.

FIG. 1 is a diagram illustrating the outline of the present mode of embodiment. FIG. 1 has been prepared in order to contribute to the understanding and implementation of the present mode of embodiment, but the scope of the present invention is not restricted to the configuration example illustrated in FIG. 1. In the storage system according to the present mode of embodiment, a storage apparatus 1 is coupled to a host computer 2, offering a logical storage area to the host computer 2.

The storage apparatus 1 includes, for example, a front end interface (FE I/F) portion 11, a back end interface (BE I/F) portion 12, storing apparatuses (121A, 121B), a microprocessor (MP) 130 and a flash memory (FM) board 141.

The FM board 141 is an example of a 'cache control portion'. The FM board 141 includes, for example, a controller 1410, a flash memory (FM hereinafter) 1411 as an example of a 'non-volatile cache memory', and a VM 1412 as an example of a 'volatile memory'. The VM 1412 consists for example of a DRAM (Dynamic Random Access Memory).

In FIG. 1, the MP 130 and the controller 1410 are illustrated as though they exchange data directly, but in practice, as discussed hereinafter, the MP 130 and the controller 1410 exchange data via the VM 1412.

As discussed hereinafter, the VM 1412 stores various types of information 14120, 14122 relating to security functions (functions which encrypt stored data) of the storage apparatus 1, and decrypted data or data prior to encryption. Because the VM 1412 is a volatile memory, confidential information stored in the VM 1412 is lost instantaneously when the VM 1412 is removed from the storage apparatus 1. Security can therefore be maintained. The detailed configuration of the storage apparatus 1 is discussed hereinafter in FIG. 2.

The FE I/F portion 11 is an apparatus used to communicate with the host computer 2. The BE I/F portion 12 is an apparatus used to communicate with the storing apparatuses 121A(1), 121A(2), 121B(1), 121B(2). The storage apparatus 1 can use as storing apparatuses an HDD 121A(1) and an HDD 121A(2), and/or an SSD 121B(1) and an SSD 121B(2). Hereinafter, when the HDD 121A(1) and the HDD 121A(2) are not being distinguished from each other, they are referred to as the HDD 121A. When the SSD 121B(1) and the SSD 121B(2) are not being distinguished from each other, they are referred to as the SSD 121B. When the HDD 121A and the SSD 121B are not being distinguished from each other, they are referred to as the storing apparatus 121.

The microprocessor 130 processes commands received from the host computer 2, and returns the process results to the host computer 2, which is the command issuer. The FM board 141 offers a cache function to the microprocessor 130. The FM board 141 stores data received from the host computer 2 in the FM 1411, and stores data read from the storing apparatus 121 in the FM 1411. As discussed hereinafter, the FM board 141 encrypts data stored in the FM 1411 in conjunction with a data encryption process applied to the storing apparatus 121. Data stored in a storage area in the storing apparatus 121, which is a storage area in the final storage destination, correspond to 'first data'. Cache data stored in the FM 1411 which are data corresponding to the first data, correspond to 'second data'.

The MP 130 of the storage apparatus 1 offers a logical volume (see LDEV 124 in FIG. 2), which is a logical storage area, to the host computer 2. The MP 130 groups physical storage areas possessed by the storing apparatus 121 into a parity group 123, and offers a portion of the storage areas possessed by the parity group 123 to the host computer 2 as a logical volume 124. The host computer 2 reads and writes data to and from the logical volume 124 offered by the storage apparatus 1.

It should be noted that the logical volume offered to the host computer 2 by the storage apparatus 1 includes a normal logical volume (V-VOL) and a thin provisioning volume (DP-VOL) with which it is possible to define a capacity that is equal to or greater than the actual capacity.

A normal logical volume is an example of a 'first volume', and is mapped directly to the physical storing apparatus 121, and thus a storage area corresponding to the capacity is retained from the outset. In contrast, a thin provisioning volume, which is an example of a 'second volume', uses a storage area managed as a pool, in accordance with writing by the host computer 2, and therefore the capacity shown to the host computer 2 is different from the size of the storage area actually retained.

In a thin provisioning volume, the storage area is allocated to the thin provisioning volume in accordance with the usage by the host computer 2. Therefore the thin provisioning volume can offer a large-capacity volume to the host computer 2 by using the storage area of the storing apparatus 121 efficiently.

Information relating to the storing apparatus 121 and the logical volume are retained in volatile local memory possessed by the MP 130 (see the LU management information 1312 in FIG. 2).

An encryption key EK used to encrypt data stored in the storing apparatus 121, which is the final storage destination area of data used by the host computer 2, is allocated in advance to the storing apparatus 121. Information indicating the correspondence between the storing apparatus 121 and the encryption key allocated to the storing apparatus 121 is stored in a local memory possessed by the MP 130 (see key management information 1311 in FIG. 2).

The MP 130 of the storage apparatus 1 receives commands from the host computer 2 via the FE I/F portion 11. Commands issued by the host computer 2 include write commands requesting the writing of data to a logical volume, and read commands requesting the reading of data from a logical volume. Hereinafter, requests resulting from write commands are referred to as write requests, and requests resulting from read commands are referred to as read requests.

When the MP 130 of the storage apparatus 1 receives a write request and data (data to be written) from the host computer 2, it transfers write destination address information and the data to be written WD to the FM board 141. The controller 1410 of the FM board 141 controls the writing of the data into the FM 1411.

When the controller 1410 receives the write destination address information and the data to be written WD from the MP 130, it acquires an encryption key EK(A) which has been allocated to the storing apparatus 121A(1), which is the final storage destination, and encrypts the data to be written WD using the encryption key EK(A).

The controller 1410 stores the encrypted data to be written WD in the FM 1411. The controller 1410 can acquire the encryption key EK(A) used to encrypt the data to be written WD by referring to the key management information 1311 and the LU management information 1312 retained by the MP130. By means of a subsequent destaging process, the data to be written WD, which are stored in the FM 1411, are written to the storing apparatus 121A(1), which has been specified as the final storage destination. In this way, in the present mode of embodiment, data WD stored in the FM 1411, which is a cache memory, and data WD which are written to the storing apparatus 121A(1) can be encrypted using the same encryption key EK(A).

It should be noted that the data WD transferred from the FM 1411 to the storing apparatus 121A(1) are in a so-called clean state. If the free area in the FM 1411 becomes smaller, the clean-state data WD are erased from the FM 1411 and other data are stored in the vacated area.

On the other hand, if the MP 130 of the storage apparatus 1 receives a read request from the host computer 2 via the FE I/F portion 11, read destination address information included in the read request is transferred to the FM board 141.

The controller 1410 of the FM board 141 confirms whether the data to be read RD identified by the read destination address information are stored in the FM 1411 which serves as the non-volatile cache memory.

If the data to be read RD are not stored in the FM 1411, the controller 1410 requests the MP 130 to transfer the data to be read from the storing apparatus 121B(1) to the FM board 141.

The storing apparatus 121B(1) encrypts and stores data using an encryption key EK(C) allocated to the storing apparatus 121B(1). Therefore the data to be read RD that are transferred from the storing apparatus 121B(1) to the FM board 141 and are stored in the FM 1411 have been encrypted.

When the controller 1410 has confirmed that the data to be read RD are stored in the FM 1411, it identifies the encryption key EK(C) allocated to the storing apparatus 121B(1), which is the final storage destination of the data to be read RD, and acquires the encryption key EK(C). The controller 1410 decrypts the data to be read RD using the acquired encryption key EK(C), and transmits the decrypted data to be read RD from the FE I/F portion 11 to the host computer 2.

In this way, in the present mode of embodiment, encrypted data RD stored in the storing apparatus 121B(1) are transferred to the FM 1411, and the data RD are decrypted within the FM board 141 and are transmitted to the host computer 2.

As discussed hereinabove, according to the present mode of embodiment, data in the FM 1411 can be encrypted by means of an encryption key that is identical to the encryption key used in the final storage destination area of the data. Therefore data stored in the non-volatile cache memory and data saved in the storing apparatus 121, which is the final storage destination, can be protected to an identical level of security employing a common encryption key.

Further, according to the present mode of embodiment, both data in the storing apparatus 121 and data in the FM 1411 can be rendered unusable simply by erasing the encryption key used to encrypt the data to be erased. Therefore a high level of security can be achieved using a simple operation, thereby improving the ease of use.

[Embodiment 1]

A first embodiment will be described with reference to FIG. 2 to FIG. 16. FIG. 2 illustrates the overall configuration of a storage system in the present embodiment. The storage system includes for example a storage apparatus 1, a host computer 2 and a management computer 3.

The storage apparatus 1 includes a storage controller 10 and a plurality of storing apparatuses 121. The storage controller 10 comprises for example an FE I/F portion (FEPK: FrontEnd PacKage) 11, a BE I/F portion (BEPK: BackEnd PacKage) 12, a control portion (MPPK: Micro Processor PacKage) 13 and a shared memory portion (CMPK: Cache Memory PacKage) 14. The apparatuses 11, 12, 13, 14 are each provided in plurality, and can communicate with each other via an internal network 15. Hereinafter the FE I/F portion 11 is referred to as the FEPK 11, the BE I/F portion 12 is referred to as the BEPK 12, and the control portion 13 is referred to as the MPPK 13.

The FEPK 11 is responsible for communications with the host computer 2 and comprises a plurality of host I/Fs 110. The FEPK 11 is coupled via the host I/Fs 110 in such a way that it can communicate with the host computer 2, which is the origin of write requests and read requests. Further, the FEPK 11 is also coupled to the internal network 15. In this way, the FEPK 11 serves as an intermediary between the host computer 2 and a logical volume for the delivery of data to be read or data to be written. In the following explanation, data to be read are also referred to as read data, and data to be written are also referred to as write data.

The BEPK 12 is responsible for communications with the storing apparatuses 121, and comprises a plurality of media I/Fs 120. The BEPK 12 is coupled to the storing apparatus 121 via the media I/Fs 120 and cables, which are not shown in the drawing. Further, the BEPK 12 is also coupled to the internal network 15. In this way, the BEPK 12 serves as an intermediary between the internal network 15 side and the storing apparatus 121 for the delivery of data to be read or data to be written.

The MPPK 13 controls the operations of the storage apparatus 1, and for example a plurality of microprocessors (MPs) 130 are coupled to a local memory (LM) 131 via an internal bus 132. The LM 131, consisting of non-volatile memory, stores key management information 1311 and LU management information 1312, which are respectively portions of the control information stored in the shared memory 140.

The MP 130 manages the configuration of the storage apparatus 1 in accordance with instructions from the host computer 2 or the management computer 3, and controls processing within the storage apparatus 1. For example, by grouping a plurality of the same type of storing apparatuses 121 together, the MP 130 virtualizes the physical storage areas possessed by each storing apparatus 121 to form a parity group 123, which is a logical storage area. The MP 130 selects and extracts a portion of the area in the parity group 123 as an LDEV (Logical DEVice) 124, and offers this as a logical volume to the host computer 2. The MP 130 sets a communication pathway from the host computer 2 to the logical volume, and access privileges, for example. In this way the host computer 2 can read and write data by accessing the offered logical volume. A logical volume created in this way is a normal logical volume mapped directly to a physical storage area.

The storage apparatus 1 can also offer to the host computer 2 a logical volume having a different format from a normal logical volume. The MP 130 manages a plurality of LDEVs 124 as a pool, and can also create a thin provisioning volume which uses logical storage areas within the pool in accordance with the state of use by the host computer 2. The actual capacity of a thin provisioning volume immediately after creation is zero, but the capacity can be made to appear large to the host computer 2.

The host computer 2 recognizes and uses the offered logical volume as a logical apparatus (LU: Logical Unit). In the following explanation, this is referred to as a logical volume 124. A normal logical volume corresponding directly to a physical storage area is referred to as a normal volume or a virtual volume (V-VOL). A logical volume which uses the logical storage areas in the pool as necessary is referred to as a DP-VOL.

It should be noted that a plurality of LDEVs may be mapped to an LU, but here it is assumed that one LDEV is mapped to one LU. Further, the logical apparatus is an LU as seen from the host computer 2, and an LDEV as seen from the storage apparatus 1, but in the following explanation the LDEV and the LU are in some cases described without differentiation as the logical volume 124.

The CMPK 14 is used by each MPPK 13. The CMPK 14 comprises, for example, a shared memory (SM) 140 and an FM board 141. The SM 140 stores various types of information required by processes performed in the storage apparatus 1, for example control information and configuration information.

The SM 140 stores key management information and LU management information, which are not shown in the drawings. The key management information and the LU management information retained by the SM 140 have the same basic configuration as the key management information 1311 and the LU management information 1312 retained by the LM 131 of the MPPK 13. However, the key management information of the SM 140 manages all the encryption keys used in the storage apparatus 1. The LU management information of the SM 140 manages all the LUs provided in the storage apparatus 1. Only the required parts of the information managed by the SM 140 are copied to the LM 131.

The FM board 141 controls the cache memory. The FM board 141 is configured, for example, by coupling a controller 1410, a plurality of FMs 1411 and a volatile memory (VM) 1412 such as a DRAM, using a bus 1413.

The VM 1412 stores, for example, data encryption key information 14120, cache management information 14121 and temporary key management information 14122. The VM 1412 is also used as a buffer area. Moreover, the VM 1412 is used as a working area when data to be written to the FM 1411 are being encrypted. Further, the VM 1412 is also used as a working area when data to be transferred from the FM 1411 to the host computer 2 are being decrypted. Because the VM 1412 is a volatile memory, the information 14120, 14121, 14122 is lost instantaneously when it is removed from the storage apparatus 1.

The management information used in the present embodiment will now be described with reference to FIG. 3 to FIG. 7. Examples of the configuration of each item of management information will be described hereinafter. The configuration of each item of management information does not necessarily need to be as illustrated in the drawings. Fields not depicted in the drawings may also be included. Further, one item of management information may be split into a plurality of items of management information, and conversely a plurality of items of management information may be combined into a single item of management information. It is not necessary for all the fields included in each item of management information to be used, and a configuration may be employed in which the information in some of the fields is not used.

FIG. 3 illustrates a configuration example of key management information 1311 possessed by a storage management function 1310. The key management information 1311 is an example of 'first key management information', and it manages encryption keys used in the encryption and decryption of data within the storage apparatus 1.

The key management information 1311 maps, for example, a key ID field 1311$a$, a key field 1311$b$, a physical storing apparatus ID field 1311$c$ and a cache in-use flag field 1311$d$.

The key ID field 1311$a$ stores a key ID, which is identification information used to uniquely identify an encryption key within the storage apparatus 1. The key field 1311$b$ stores encryption key data. The storing apparatus ID field 1311$c$ stores a storing apparatus ID, which is identification information used to uniquely identify within the storage apparatus 1 the storing apparatus 121 to which the encryption key has been allocated. The cache in-use flag field 1311$d$ stores a cache in-use flag, which is information indicating whether or not data encrypted using the encryption key identified by the key ID field 1311$a$ are stored in the FM 1411, which is a non-volatile cache memory.

A configuration example of the LU management information 1312 used by the storage management function 1310 will now be explained with reference to FIG. 4. The LU management information 1312 is information used to manage the storage resources on each level possessed by the storage apparatus 1. The LU management information 1312 maps, for example, a LUN field 1312$a$, an LDEV attribute field 1312$b$, an LBA range field 1312$c$, a storing apparatus ID field 1312$f$ and an LBA range field 1312$g$.

The LUN field 1312$a$ stores a LUN (Logical Unit Number), which is identification information uniquely identifying a logical volume within the storage apparatus 1. The LDEV attribute field 1312$b$ stores information indicating whether the attribute (LDEV attribute) of the logical volume identified by the LUN field 1312$a$ is 'V-VOL' or 'DP-VOL'.

The LBA range field 1312$c$ identifies an LBA (Logical Block Addressing) range in the logical volume by means of a start address 1312$d$ and an end address 1312$e$. The storing apparatus ID field 1312$f$ stores a storing apparatus ID, which is identification information uniquely identifying within the storage apparatus 1 the storing apparatus 121 constituting the logical volume. The LBA range field 1312$g$ identifies, by means of a start address 1312$h$ and an end address 1312$i$, information indicating which storage area range from the entire storage area of the storing apparatus 121 is used to configure the logical volume.

FIG. 5 illustrates a configuration example of data encryption key information 14120 used by the controller 1410 of the FM board 141. The data encryption key information 14120 is an example of 'encryption key information', and it manages encryption keys used in the encryption and decryption of data within the storage apparatus 1.

The data encryption key information 14120 maps, for example, a LUN field 14120$a$, an LBA field 14120$b$, a key field 14120c, a temporary key usage flag 14120d, an FM ID 14120e and a cache segment ID 14120f.

The LUN field 14120 stores a LUN. The LBA field 14120b stores an LBA of the logical volume identified by the LUN in the LUN field 14120a. The key field 14120c stores encryption key data used in data encryption.

The temporary key usage flag field 14120d stores a flag indicating whether or not an encryption key that is used temporarily is being used. Where the temporary key usage flag field 14120d is set to 'FALSE', this indicates that data encrypted using a normal encryption key are stored in the LBA. Where the temporary key usage flag field 14120d is set to 'TRUE', this indicates that data encrypted using a temporary key are stored in the LBA. FIG. 5 illustrates a condition in which encryption has been performed in each LBA using a normal encryption key, without using any temporary keys.

The FM ID field 14120e stores an FM ID used to distinguish an FM 1411, which is a non-volatile cache memory, within the FM board 141. The cache segment ID field 14120f stores a cache segment ID, which is identification information uniquely identifying each cache segment possessed by the FM 1411.

FIG. 6 illustrates a configuration example of cache management information 14121 used by the controller 1410 of the FM board 141. The cache management information 14121 manages the usage state of the FM 1411 serving as a non-volatile cache memory.

The cache management information 14121 maps, for example, an FM ID field 1412a, a cache segment field 14121b, a LUN field 14121c, an LBA field 14121d and a reserve field 14121e.

The FM ID field 1412a stores an FM ID, which is identification information uniquely identifying an FM 1411 within the FM board 141. The cache segment field 14121b stores a cache segment ID, which is identification information uniquely identifying each cache segment possessed by the FM 1411. The LUN field 14121c stores a LUN identifying a logical volume in which data stored in the cache segment are stored. The LBA field 14121d identifies an LBA of the logical volume identified by the LUN field 14121c. The reserve field 14121e stores information indicating whether data are scheduled to be stored in the cache segment. When 'FALSE' is set for the LBA identified by the LBA field 14121d, this indicates that data have already been stored in the LBA. When 'TRUE' is set, this indicates that the storage of data in the LBA is awaited.

FIG. 7 illustrates a configuration example of temporary key management information 14122 used by the controller 1410 of the FM board 141. A temporary key is an example of a 'prescribed encryption key'. A temporary key is a temporary encryption key used prior to the identification of an encryption key used in the storing apparatus 121, the temporary keys being managed by the temporary key management information 14122. The temporary key management information 14122 is an example of 'prescribed key management information'.

The temporary key management information 14122 maps, for example, an FM ID field 14122a, a cache segment ID field 14122b, and a key ID field 14122c. The FM ID field 14122a stores an FM ID uniquely identifying an FM 1411. The cache segment ID field 14122b stores a cache segment ID uniquely identifying a cache segment of the FM 1411. The key ID 14122c stores a key ID uniquely identifying an encryption key (temporary key) used temporarily within the storage apparatus 1.

A process to write data to a logical volume will now be described with reference to FIG. 8 to FIG. 10. FIG. 8 illustrates a summary of the write process.

The MP 130 receives a write request and data to be written from the host computer 2 via the FEPK 11. When the controller 1410 of the FM board 141 receives the write request and the data to be written from the MP 130, the process begins.

The controller 1410 of the FM board 141 stores the data to be written, received from the MP 130, in the VM 1412. The controller 1410 identifies the write destination of the data to be written based on the received write request (S10). Moreover, the controller 1410 identifies the LUN and LBA of the write destination of the data to be written, and stores these respectively in the LUN field 14120a and the LBA field 14120b of the data encryption key information 14120 (S10). At this time, 'FALSE' is stored in all the temporary key usage flag fields 14120d of the data encryption key information 14120, as shown in FIG. 5.

The controller 1410 acquires (S11) the encryption key allocated to the storing apparatus 121, which is the final storage destination of the data to be written, by means of an encryption key acquisition process which is discussed hereinafter. Moreover, the controller 1410 identifies the encryption key allocated to the storage area in the final storage destination of the data to be written (the storage area within the storing apparatus 121), based on the LU management information 1312 and the key management information 1311 retained by the LM 131, and acquires the encryption key. Details of the process to acquire the encryption key (S11) are discussed in FIG. 9. The storing apparatus 121 in which the data to be written are to be stored is an example of a 'prescribed storing apparatus'.

The controller 1410 encrypts the data to be written using the encryption key acquired in step S11, and stores the encrypted data to be written in the FM 1411 of the FM board 141 (S12). Details of step S12 are discussed hereinafter in FIG. 10.

The process in step S11 in FIG. 8 will now be described with reference to FIG. 9. This process is triggered to start when the process in the abovementioned step S10 is complete.

The controller 1410 of the FM board 141 acquires the LDEV attribute 1312b mapped to a LUN which is identical to the LUN stored in the LUN field 14120a of the data encryption key information 14120, from among the LUN fields 1312a in the LU management information 1312 (S110). In other words, the controller 1410 acquires the attribute of the write destination logical volume. The controller 1410 determines whether the acquired LDEV attribute 1312b is 'V-VOL' (S111).

If the controller 1410 determines that the LDEV attribute of the write destination logical volume is not 'V-VOL' (5111: NO), it stores 'TRUE' in the temporary key usage flag 14120d of the data encryption key information 14120 (S117) and ends the process. In this case, the LDEV attribute of the write destination logical volume is 'DP-VOL', and thus an encryption key is not identified until a logical storage area (page) is selected from the pool. Therefore a temporary encryption key is used.

On the other hand, if the controller 1410 determines that the LDEV attribute of the write destination logical volume is 'V-VOL' (S111: YES), it executes steps S113 to S115 of the loop L11 comprising step S112 to step S116.

The controller 1410 refers to the data encryption key information 14120, and executes S113 to S115 for each LBA 14120*b* that is mapped to the LUN 14120*a* of the write destination logical volume.

More specifically, the controller 1410 selects one LBA from the LBA field 14120*b* of the data encryption key information 14120 (S112). The selected LBA is referred to as the LBA being processed. The controller 1410 refers to the LU management information 1312 stored in the LM 131 to identify the storing apparatus ID that is allocated to the LBA being processed (S113).

The controller 1410 refers to the key management information 1311 stored in the LM 131 and acquires from the key field 1311*b* the encryption key allocated to the storing apparatus ID identified in step S113 (S114). The controller 1410 stores the encryption key acquired in step S114 in the key field 14120*c* of the data encryption key information 14120.

The controller 1410 selects, as already processed LBA that is regarded as a process target, one unprocessed LBA from the LBAs stored in the LBA field 14120*b* of the data encryption key information 14120, and returns to step S113. When steps S113 to S115 in the loop L11 have been executed in this way for all the LBAs stored in the data encryption key information 14120, the process ends.

The process in step S12 in FIG. 8 will now be described with reference to FIG. 10. This process is triggered to start when the process in the abovementioned step S11 is complete.

The controller 1410 of the FM board 141 designates the respective cache segments, which are the storage destinations for the encrypted data, for all the LBAs stored in the data encryption key information 14120 (S120). The controller 1410 updates the LUN field 14121*c* and the LBA field 12141*d* of the cache management information 14121, for each designated cache segment, and also stores 'TRUE' in each reserve field 14121*e*. Updating the LUN field 14121*c* and the LBA field 12141*d* means setting the LUN acquired from the LUN field 14120*a* of the data encryption key information 14120 in the LUN field 14121*c* of the cache segment designated as the data storage destination, and setting the LBA acquired from the LBA field 14120*b* of the data encryption key information 14120 in the LBA field 14121*d* of the abovementioned designated cache segment.

In the loop L12 comprising step S121 to step S129 the controller 1410 encrypts the data scheduled to be written (data to be written) to the write destination LBA of the logical volume, for each cache segment, and stores the data in the cache segment of the FM 1411.

The controller 1410 selects, as a cache segment ID to be processed, one cache segment ID for which 'TRUE' has been stored in the reserve field 14121*e* of the cache management information 14121 (S121). Hereinafter, the storing of data in a cache segment identified by a cache segment ID being processed is in some cases expressed as storing data in a cache segment being processed.

The controller 1410 refers to the temporary key usage flag 14120*d* relating to the cache segment ID being processed, and determines whether or not the data to be stored in the cache segment being processed are to be encrypted using a temporary key (S122).

If 'TRUE' is stored in the temporary key usage flag 14120*d*, the controller 1410 determines that the encryption of the data to be stored in the cache segment being processed is to be performed using a temporary key (S122: YES). Accordingly, the controller 1410 acquires a temporary key to be used with the cache segment being processed and stores it in the data encryption key information 14120 (S123).

More specifically, the controller 1410 identifies from the temporary key management information 14122 a key ID which has a cache segment ID matching that being processed and a matching FM ID, and acquires from the key management information 1311 stored in the LM 131 the encryption key having the key ID that has been identified. Then the controller 1410 stores the acquired encryption key (temporary key) in the key field 14120*c* of the data encryption key information 14120 (S123).

On the other hand, if the temporary key usage flag 14120*d* is set to 'FALSE', the controller 1410 determines that the encryption of the data to be stored in the cache segment being processed is to be performed without using a temporary key (S122: NO).

In the loop L13 comprising step S124 to step S126, the controller 1410 encrypts the data to be stored in the cache segment being processed, using the encryption key stored in the key field 14120*c* of the data encryption key information 14120 (S125).

A more detailed explanation will now be provided. The controller 1410 selects as an LBA to be processed one of the LBAs stored in the cache segment being processed (S124). The controller 1410 refers to the data encryption key information 14120 and acquires the encryption key from the key field 14120*c* corresponding to the LBA being processed. The controller 1410 encrypts the data stored in the LBA being processed, using the acquired encryption key (S125). This completes one cycle of the processes in the loop L13.

The controller 1410 selects one unprocessed LBA from the LBAs stored in the cache segment being processed (S124), and executes the process in the abovementioned step S125. In this way the controller 1410 implements the processes in the loop L13 for all the LBAs stored in the cache segment being processed.

The controller 1410 stores the encrypted data in the cache segment being processed (S127) and stores 'FALSE' in the reserve field 14121*e* of the cache management information 14121 (S128). This completes one cycle of the processes in the loop L12.

The controller 1410 selects, as a cache segment to be processed, one cache segment for which 'TRUE' has been stored in the reserve field 14121*e* of the cache management information 14121 (S121). When the controller 1410 has implemented the processes in the loop L12 in this way for all the cache segments for which 'TRUE' has been stored in the reserve field 14121*e* of the cache management information 14121 (S129), the process ends.

By means of the write process discussed with reference to FIG. 8 to FIG. 10, the encryption key used when the data to be written are stored in the storing apparatus 121, which is the final storage destination area, can be made to coincide with the encryption key used when the data are stored in the FM 1411.

In other words, in the present embodiment the data to be written, which are cached in the non-volatile cache memory 1411, can be encrypted using the encryption key used in the final storage destination of the data to be written. Therefore the security levels relating to the encryption of data cached in the FM 1411, which is a non-volatile cache memory, and the encryption of data stored in the storing apparatus 121 can be made to coincide, improving reliability and ease of use.

A process in which data encrypted using a temporary key are re-encrypted using a normal encryption key will now be described with reference to FIG. 11. In the present specification this process is referred to as a Rekey process.

As discussed in the write process, at the point in time at which the data to be written are stored in the FM 1411, there are some situations in which the storing apparatus 121, which is the final storage destination, is not established. This occurs in the case of a 'DP-VOL' in which a logical storage area within a pool is dynamically allocated in accordance with writing to the volume by the host computer 2.

Even if the storing apparatus 121 is not designated when data are stored in the FM 1411, the final storage destination storing apparatus 121 is designated prior to the start of the destaging process in which the data are transferred from the FM 1411 and are written to the storing apparatus 121.

Prior to the start of the destaging process of the data stored in the FM 1411, if the storing apparatus 121 which is the final storage destination has been established, the storage management function 1310 sends the LUN and LBA of the data to be destaged and the encryption key to the controller 1410 of the FM board 141. After decrypting the data being destaged, using the temporary key, the controller 1410 encrypts the data once again using the encryption key received from the storage management function 1310. By this means the key used to encrypt the data being destaged is changed from a temporary key to an encryption key allocated to the storing apparatus 121, which is the final storage destination.

The Rekey process will now be described with reference to FIG. 11. This process is triggered to start when the controller 1410 of the FM board 141 receives the LUN and LBA of the target data and a Rekey destination encryption key from the storage management function 1310. The target data are the data to be subjected to the Rekey process (originally the data to be written), and hereinafter they are also referred to as Rekey target data. A Rekey destination encryption key is an encryption key allocated to the storing apparatus 121, which is the final storage destination of the target data, and is also in some cases referred to simply as an encryption key.

The controller 1410 stores in the data encryption key information 14120 the LUN and LBA of the Rekey target data and the Rekey destination encryption key received from the storage management function 1310, and retains these for the Rekey process (S210). Next the controller 1410 changes the encryption key used for the target data, in the loop L21 comprising step S211 to step S216.

The controller 1410 selects one LBA to be processed, from the LBA field 14120b of the data encryption key information 14120 (S211). The controller 1410 identifies from the cache management information 14121 the FM ID and the cache segment ID for an entry in which the values in the LUN field 14121c and the LBA field 14121d match the LUN and the LBA of the target LBA (S212).

The controller 1410 identifies the key ID for an entry in which the values in the FM ID field 14122a and the cache segment ID field 14122b of the temporary key management information 14122 match the FM ID and the cache segment ID identified in step S212 (S213). Then the controller 1410 refers to the key management information 1311 stored in the LM 131, and acquires an encryption key having a key ID which matches the key ID identified in step S213 (S214).

The controller 1410 reads the Rekey target data from the cache segment and decrypts the data using the encryption key (here, a temporary key) acquired in step S214 (S215). Further, the controller 1410 encrypts the Rekey target data again using the Rekey destination encryption key that was stored in step S210, and writes the data back to the cache segment from which the Rekey target data were read (S215). This completes one cycle of the processes in the loop L21.

The controller 1410 selects one unprocessed LBA from the LBA field 14120b of the data encryption key information 14120 (S211), and repeatedly executes steps S212 to S215. When the controller 1410 has implemented the processes in the loop L31 for all the LBAs stored in the data encryption key information 14120 (S216), the process ends.

As discussed hereinabove, data stored in the FM 1411 can be encrypted prior to the start of the destaging process using the encryption key allocated to the storing apparatus 121, which is the final storage destination of the data.

The destaging process will now be described. The destaging process is implemented by the storage management function 1310 asynchronously with the processing of the write request from the host computer 2. The storage management function 1310 specifies an LU and a LBA to the controller 1410 and requests that the data to be destaged are transferred.

Here, if the storing apparatus 121 which is the final storage destination has been established at the time the destaging process starts, the storage management function 1310 includes a decryption request in the request to transfer the data to be destaged, sent to the controller 1410. A decryption request is a request to the controller 1410 to decrypt the data being destaged.

When the controller 1410 receives the request to transfer the data to be destaged, it transfers the data to be destaged, stored in the FM 1411, to the MPPK 13, either after decryption or without modification, depending on the presence or absence of a decryption request. If the storage management function 1310 has sent a decryption request to the controller 1410, the controller 1410 transfers the data being destaged to the MPPK 13 after decrypting the data. If the storage management function 1310 has not sent a decryption request to the controller 1410, the controller 1410 transfers the data being destaged to the MPPK 13, without modification.

When the storage management function 1310 receives the data being destaged from the controller 1410, it stores the data in the storing apparatus 121, which is the final data storage destination area, via the BEPK 12. When the storage management function 1310 has confirmed that the data being destaged have been stored in the storing apparatus 121, it notifies the controller 1410 that the destaging process is complete.

By means of the Rekey process discussed hereinabove, data (data to be written) that were encrypted using a temporary key due to the fact that the final storage destination had not been established at the point in time when the data were stored in the FM 1411 can be encrypted when the storage destination storing apparatus 121 has been designated, using the encryption key allocated to the storing apparatus 121. Therefore the encryption key used in the storing apparatus 121 which is the final storage destination and the encryption key used in the FM 1411 can be made identical, and thus an identical security level can be maintained irrespective of the storage location of the data.

The destaging process in which data are transferred from the FM 1411 to the storing apparatus 121 will now be described with reference to FIG. 12. This process is triggered to start when the controller 1410 of the FM board 141 receives a request from the storage management function 1310 to transfer data to be destaged.

The controller 1410 determines whether or not a decryption request is included in the request to transfer the data to be destaged (S300). If a decryption request is not included in the request to transfer the data to be destaged (S300: NO), then in the loop L31 comprising steps S301 to S303 the controller 1410 reads from the FM 1411 the data to be destaged and stores the data without modification in the VM 1412.

More specifically, based on the transfer request the controller 1410 selects from the LBAs of the data to be destaged one target LBA (S301). The controller 1410 refers to the cache management information 14121, identifies a cache segment ID for an entry in which the LUN and the LBA match those selected in step S301, reads the data stored in the identified cache segment and stores them without modification in the VM 1412 (S302). This completes one cycle of the loop L31.

The controller 1410 selects one unprocessed LBA from the LBAs of the data being destaged (S301), and executes step S302. When the processes in the loop L31 have been executed in this way for all the LUs and LBAs of the data being destaged (S303), the flow advances to step S309 discussed hereinafter.

On the other hand, if a decryption request is included in the request to transfer the data to be destaged (S300: YES), then in the loop L32 comprising steps S304 to S308 the data being destaged are read from the FM 1411, and the data being destaged, which have been read, are decrypted and are stored in the VM 1412.

More specifically, based on the request to transfer the data to be destaged, the controller 1410 selects from the LUs and LBAs of the data to be destaged one LBA as a target LBA (S304).

The controller 1410 identifies the FM ID and the cache segment ID for an entry in which the LUN field 14121c and the LBA field 14121d of the cache management information 14121 match the LBA (and LUN) selected in step S304 (S305).

The controller 1410 acquires the key ID for an entry in which the values in the FM ID field 14122a and the cache segment ID field 14122b from the temporary key management information 14122 match the FM ID and the cache segment ID identified in step S305 (S306). Further, the controller 1410 acquires from the key management information 1311 of the LM 131 the encryption key having a key ID which matches the key ID acquired in step S306 (S306).

The controller 1410 reads the data being destaged from the cache segment, decrypts the data being destaged, which have been read, using the encryption key acquired in step S307, and stores the data in the VM 1412 (S307). Data in an unencrypted state are stored temporarily in the VM1412, but because the VM1412 is a volatile memory, the stored contents are lost instantaneously if removed from the storage apparatus 1. Therefore no security problems arise even if the decrypted data are stored in the VM 1412.

When as discussed hereinabove all of the data to be destaged have been read from the cache segment, decrypted and stored in the VM 1412 (S308), the loop 32 is complete.

When the controller 1410 has read the data being destaged from the FM 1411 and has stored the data in the VM 1412, it transfers the data being destaged to the storage management function 1310 (S309). The storage management function 1310 stores the data being destaged, received from the FM board 141, in a prescribed area in the storing apparatus 121, which is the final storage destination, and notifies the controller 1410 that the process is complete. When the data being destaged are written to the storing apparatus 121, the data being destaged are encrypted using an encryption key allocated to the storing apparatus 121.

When the controller 1410 receives the abovementioned notification from the storage management function 1310, it deletes the LUN and LBA relating to the data being destaged, for which the destaging process has been completed, from the cache management information 1412 (S310), and the process ends.

By means of the destaging process discussed hereinabove, data to be written (which are also data to be destaged) which are stored in the FM 1411, a non-volatile cache memory, can be encrypted using an appropriate encryption key and stored in the final data storage destination area.

In contrast to the destaging process, a process in which data stored in the storing apparatus 121 are transferred to the FM 1411, the non-volatile cache memory, is referred to as a staging process. The staging process is implemented as necessary by the storage management function 1310 when a read request is issued by the host computer 2.

When the storage management function 1310 confirms a read request from the host computer 2, it determines whether or not the requested data are stored in the FM 1411. If the data requested to be read are not stored in the FM 1411, the storage management function 1310 reads the data to be staged from the storing apparatus 121. The storage management function 1310 specifies to the controller 1410 the LUN and the LBA of the data to be staged, and requests the execution of the staging process. When the controller 1410 receives the data to be staged and the staging request, it stores the data to be staged in the FM 1411.

The staging process will now be described with reference to FIG. 13 and FIG. 14. FIG. 13 will first be described. The staging process illustrated in FIG. 13 is triggered to start when the storage management function 1310 receives a read request from the host computer 2. In FIG. 13, the storage management function 1310 is responsible for steps S400 to S403, and the controller 1410 of the FM board 141 is responsible for step S404.

The storage management function 1310 identifies the LUN and the LBA of the data to be staged (which are also the data to be read) (S400). The LUN and the LBA of the data to be staged will be referred to as the target LUN and LBA.

The storage management function 1310 determines whether the data to be staged are stored in the cache (S401). Moreover, the storage management function 1310 confirms whether there is an entry for which the LUN field 14121c and the LBA field 14121d of the cache management information 14121 match the target LUN and LBA identified in step S400 (S401).

If the data to be staged are not stored in the FM 1411 (S401: NO), the storage management function 1310 reads the data to be staged from the storing apparatus 121 (S402). In other words, if the target LUN and LBA are not recorded in the cache management information 14121, the storage management function 1310 identifies a storing apparatus ID and LBA for which the LUN field 1312a and the LBA field 1312c in the LU management information 1312 match the target LUN and LBA, and reads the data from the identified area (S402).

The storage management function 1310 requests the controller 1410 to store the data being staged, read in step S402, in the FM 1411 (S403). The staging request includes the target LUN and LBA. The controller 1410 stores the data being staged in the FM 1411 in accordance with the staging request.

On the other hand, if the storage management function 1310 determines that the data to be staged are stored in the FM 1411 (S401: YES), it ends the process.

The details of step S404 in FIG. 13 will now be described with reference to FIG. 14. This process is triggered to start when the controller 1410 of the FM board 141 receives a data staging request from the storage management function 1310.

The controller 1410 temporarily stores the data being staged, received from the storage management function 1310, in the VM 1412 (S4040). The controller 1410 designates the storage destination in the FM 1411 for the data being staged, using the cache management information 14121 (S4041).

More specifically, the controller 1410 designates the cache segment of the data storage destination for all the LBAs included in the staging request (S4041). The controller 1410 stores the LUN and the LBA of the data to be staged in the LUN field 14121*c* and the LBA field 12140*d* of the cache management information 14121 corresponding to the cache segment designated as the storage destination (S4041). The controller 1410 then stores 'TRUE' in the reserve field 14121*e* (S4041).

The controller 1410 transfers and stores the data being staged, stored in the VM 1412, to the cache segment designated in step S4041 (S4042). The controller 1410 stores 'FALSE' in the reserve field 14121*e* of the cache management information 14121 (S4043), notifies the storage management function 1310 that the process is complete, and ends the process.

By means of this process, the data to be staged (data to be read) can be transferred from the storing apparatus 121, which is the final data storage destination area, via the VM 1412, and stored in the FM 1411, which is a non-volatile cache memory. Here, the data being staged, which have been received from the storage management function 1310 (MP 130), are stored by the controller 1410 in the FM 1411 without modification. Therefore the security level of the data being staged, stored in the FM 1411, and the data in the storing apparatus 121 from which the data being staged were read, can be made identical.

The read process will now be described with reference to FIG. 15 and FIG. 16. When the storage management function 1310 receives a read request from the host computer 2, it confirms whether the data to be read are stored in the FM 1411. If the storage management function 1310 determines that the data to be read are not stored in the FM 1411 it executes the staging process discussed hereinabove.

By referring to the LU management information 1312 and the key management information 1311, the controller 1410 acquires the encryption key used to encrypt the data to be read. The controller 1410 decrypts the data to be read, cached in the FM 1411, using the acquired encryption key, and transfers the decrypted data to be read to the host computer 2 via the MP 130 and the FEPK 11.

FIG. 15 illustrates a summary of the read process. The MP 130 transfers the read request received from the host computer 2 to the controller 1410 of the FM board 141. When the controller 1410 receives the read request it executes step S50 discussed hereinafter.

Based on the received read request the controller 1410 identifies the LUN and the LBA of the data to be read and stores the identified LUN and LBA respectively in the LUN field 14120*a* and the LBA field 14120*b* of the data encryption key information 14120 (S50). At this time the controller 1410 stores 'FALSE' in the temporary key usage flags 14120*d* of each LUN in the data encryption key information 14120.

The controller 1410 identifies the encryption key used in the final storage destination area of the data to be read, based on the LU management information 1312 and the key management information 1311 stored in the LM 131, and acquires the identified encryption key (S11). The controller 1410 decrypts the data to be read using the acquired encryption key, and transfers the decrypted data to be read from the FEPK 11 to the host computer 2 (S51).

The details of step S51 in FIG. 15 will now be described with reference to FIG. 16. This process is triggered to start when the process in step S11 is complete. In the loop L16 comprising step S510 to step S516, the data to be read are decrypted based on the data encryption key information 14120 and are stored in the VM 1412.

A more detailed explanation will now be provided. The controller 1410 selects one of the cache segment IDs stored in the data encryption key information 14120 as a target cache segment (S510). The controller 1410 identifies in the data encryption key information 14120 the LU and the LBA for an entry in which the cache segment ID field 14120*e* matches the target caching segment ID (S511).

Next, in the loop L17 comprising step S512 to step S514, the controller 1410 decrypts the data stored in the target cache segment, using the encryption key specified by the data encryption key information 14120.

More specifically, the controller 1410 selects one LBA from the LUs and the LBAs of the data identified in step S511 (S512). The controller 1410 acquires from the key field 14120*c* in the data encryption key information 14120 the encryption key for which the target LU and LBA match, and decrypts the data stored in the target LU and LBA using the encryption key (S513).

The controller 1410 deems that the processes in the loop L17 have been completed for the LBA selected in step S512.

The controller 1410 selects one LBA that has not yet been processed in the loop L17, from the LUs and LBAs of data stored in the cache segment identified in step S511 (S512), and executes step S513. In this way, the controller 1410 implements the processes in the loop L17 for all the LUs and LBAs of the data stored in the cache segment identified in step S511, and decodes the data to be read (S514).

The controller 1410 stores in the VM 1412 the data decrypted by means of the processes in the loop L17 (S515). The controller 1410 deems that the processes in the loop L16 have been completed for the cache segment ID selected in step S510.

The controller 1410 selects one cache segment ID that has not been processed in the loop L17, stored in the cache segment ID field 14120*e* of the data encryption key information 14120, and returns to step S511.

When the controller 1410 has implemented the processes in the loop L16 for all the cache segment IDs stored in the data encryption key information 14120, it transfers the decrypted data to be read to the host computer 2 (S517) and ends the process.

According to the present embodiment configured in this way, data stored in the FM 1411, which is a non-volatile cache memory, can be encrypted in conjunction with the data encryption process implemented for data stored in the storing apparatus 121.

According to the present embodiment, data in the FM 1411 can be encrypted by means of an encryption key that is identical to the encryption key used in the storing apparatus 121, which is the final storage destination of the data. Therefore data stored in the FM 1411 and data saved in the storing apparatus 121 can be protected to an identical level of security employing a common encryption key.

According to the present embodiment, both data in the storing apparatus 121 and data in the FM 1411 can be rendered unusable simply by erasing the encryption key used to encrypt the data to be erased. Therefore a high level of security can be achieved using a simple operation, thereby improving the ease of use.

[Embodiment 2]

A second embodiment will be described with reference to FIG. 17. Each of the following embodiments, including the present embodiment, correspond to variations of the first embodiment, and so the descriptions focus on differences from the first embodiment. In the present embodiment a description will be given of an update process for the key management information 1311 which indicates whether or not an encryption key managed by the storage apparatus 1 is used to encrypt data stored in the FM 1411.

In the loop L61 comprising step S600 to step S606, the storage management function 1310 updates the cache in-use flag field 1311d of the key management information 1311 to a most recent condition, either regularly or with an arbitrary timing.

A more detailed explanation will now be provided. The storage management function 1310 selects one key ID from the key management information 1311 as a target key ID (S600) and identifies the storing apparatus ID to which the target key ID is allocated (S601). The storage management function 1310 refers to the LU management information 1312 to identify the LU and the LBA allocated to the identified storing apparatus ID (S602). The storage management function 1310 refers to the cache management information 14121 to determine whether the target data stored in the identified LU and LBA are stored in the FM 1411 (S603).

If the storage management function 1310 determines that the target data are not stored in the FM 1411 (S603: NO), then it stores 'FALSE' in the cache in-use flag field 1311d of the key management information 1311 (S604). In contrast, if the storage management function 1310 determines that the target data are stored in the FM 1411 (S603: YES), then it stores 'TRUE' in the cache in-use flag field 1311d of the key management information 1311 (S605).

The storage management function 1310 selects one key ID that has not been processed in the loop L61, stored in the key ID field 1311a of the key management information 1311, and returns to step S601. When storage management function 1310 has implemented the processes in the loop L61 for all the key IDs stored in the key management information 1311 (S606), the process ends.

The present embodiment configured in this way exhibits similar operational advantages to those described in the first embodiment. Further, in the present embodiment the key management information 1311 can be suitably updated, and thus the most recent conditions of encryption keys used in the FM 1411 can be understood, and the reliability of the data encryption process can be maintained.

[Embodiment 3]

A third embodiment will be described with reference to FIG. 18 to FIG. 20. In the present embodiment, the key management information 1311 illustrated in FIG. 2 is retained in the VM 1412 of the FM board 141. Further, in the present embodiment, cache key management information 14124 illustrated in FIG. 18 is stored in the VM 1412.

The cache key management information 14124 is information used to identify an encryption key used for data stored in the FM 1411. The cache key management information 14124 maps and manages, for example, a LUN field 14124a, an LBA range field 14124b, a key ID field 14124e and a fixed flag field 14124f.

The LUN field 14124a stores a LUN, which is an ID uniquely identifying an LU (logical volume) within the storage apparatus 1. The LBA range field 14124b identifies a range in which data are stored in the data storage destination logical volume. The LBA range field 14124b has a start LBA field 14124c and an end LBA field 14124d.

The key ID field 14124e stores the encryption key ID used for encrypting data stored in the storage area defined by the LBA range field 14124b. The key ID is identification information used to identify an encryption key uniquely within the storage apparatus 1.

The fixed flag field 14124f stores a fixed flag comprising information which indicates whether or not the entry is fixed in the cache key management information 14124. Entries for which the fixed flag field 14124f is set to 'FALSE' are not fixed in the cache key management information 14124. Therefore if it is necessary to create a new entry, the entry which has been used the least is deleted from the cache key management information 14124. Entries for which the fixed flag field 14124f is set to 'TRUE' are fixed in the cache key management information 14124. Even if not used for an extended period of time, the entry remains in the cache key management information 14124 without being deleted.

The cache key management information 14124 may retain the corresponding key IDs for all the LBAs of all the LUs, or it may retain the key IDs corresponding only to the LBAs of LUs having a high access frequency.

For example, it is possible to decide whether or not to retain key IDs in the cache key management information 14124 on a case-by-case basis for each LU (for each logical volume) in accordance with instructions from a security manager. This may for example be managed by storing in the fixed flag field 14124f either information indicating that the key ID should be retained (for example TRUE) or information indicating that the key ID should be not retained (for example FALSE).

In the present embodiment the cache key management information 14124 is retained in the VM 1412 of the FM board 141. As discussed hereinabove, the cache key management information 14124 is information mapping an LBA of an LU to the encryption key used in the final data storage destination area for data stored in the LBA. Therefore by referring to the cache key management information 14124 stored in the VM 1412 the controller 1410 can identify an encryption key used for data to be read and an encryption key used for data to be written.

A process for acquiring an encryption key used in a data final storage destination area will be described with reference to the flowchart in FIG. 19.

When implemented within a write process, this process is triggered to start when the process in the abovementioned step S10 illustrated in FIG. 8 is complete. When implemented within a read process, this process is triggered to start when the process in the abovementioned step S50 illustrated in FIG. 15 is complete.

In the loop L71 comprising step S700 to step S706 the controller 1410 of the FM board 141 uses the cache key management information 14124 and the key management information 1311 to identify the encryption key in the final storage destination area of the target data, and it acquires the identified encryption key.

A more detailed explanation will now be provided. The controller 1410 selects one LBA of an LU as a target LBA, from the data encryption key information 14120 (S700). The controller 1410 refers to the cache key management information 14124 to determine whether or not the target LBA selected in step S700 is registered in the cache key management information 14124 (S701). Moreover, the controller 1410 determines whether or not the encryption key used in the final storage destination area of the data stored in the FM 1411 is registered in the cache key management information 14124. As discussed hereinabove, the final storage destination area is a prescribed storage area within the storing apparatus 121 in which the original data constituting the cached data are stored.

If the target LBA is not registered in the cache key management information 14124 (S701: NO), the controller 1410 acquires the encryption key used in the final storage destination area of the data stored in the target LBA, based on the LU management information 1312 and the key management information 1311 stored in the LM 131 (S702).

On the other hand, if the target LBA is registered in the cache key management information 14124 (S701: YES), the controller 1410 identifies the key ID in an entry for which the LUN and the LBA selected in step S700 match the LUN field 14124a and the LBA range field 14124b of the cache key management information 14124 (S703).

The controller 1410 refers to the key management information 1311, acquires a key for which the key ID identified in step S703 matches the key ID field 14124e (S704), and stores the acquired key in the data encryption key information 14120 (S705).

The controller 1410 selects one LBA that has not been processed in the loop L71, stored in the LBA field 14120b of the data encryption key information 14120, and returns to step S701. When the processes in the loop L71 have been implemented for all the LBAs stored in the data encryption key information 14120 (S706), the process ends.

The details of step S702 in FIG. 19 will now be described with reference to FIG. 20. This process starts if it is determined in step S701 that the target LBA is not registered in the cache key management information 14124. The controller 1410 refers to the LU management information 1312 stored in the LM 131, and acquires the LDEV attribute for which the LUN stored in the LUN field 14120a of the data encryption key information 14120 matches the value of the LUN field 1312a in the LU management information 1312 (S7020). The controller 1410 determines whether the acquired LDEV attribute is 'V-VOL' (S7021).

If the controller 1410 determines that the acquired LDEV attribute is not 'V-VOL' (S7021: NO), it stores 'TRUE' in the temporary key usage flag 14120d of the data encryption key information 14120 (S7022) and ends the process.

On the other hand, if the controller 1410 determines that the acquired LDEV attribute is 'V-VOL' (S7021: YES), it refers to the LU management information 1312 stored in the LM 131 to identify the storing apparatus ID that is allocated to the target LBA (S7023).

The controller 1410 refers to the key management information 1311 stored in the LM 131, acquires the key ID of the encryption key allocated to the storing apparatus 121 corresponding to the identified storing apparatus ID, and stores it in the key ID field 14124e of the cache key management information 14124 (S7024).

The controller 1410 refers to the key management information 1311, acquires the encryption key allocated to the storing apparatus 121 corresponding to the identified storing apparatus ID, stores it in the key field 14120c of the data encryption key information 14120 (S7025), and ends the process.

The present embodiment configured in this way exhibits similar operational advantages to the first embodiment. Further, in the present embodiment the key management information 1311, the data encryption key information 14120 and the cache key management information 14124 are retained in the VM 1412 of the FM board 141. Therefore the controller 1410 does not need to refer to information in the LM 131 via the storage management function 1310, and it can rapidly identify and acquire an encryption key to be used for target data at the time of a read request or a write request, and the encryption key identification and acquisition processes can thus be performed more quickly.

It should be noted that the abovementioned embodiments have been described in detail in order to describe the present invention clearly, and that the present invention is not necessarily limited to one that is provided with all the constituents that have been described. Some of the constituents of a certain embodiment may be replaced with constituents of another embodiment. Constituents of a certain embodiment may be added to constituents of another embodiment. With regard to some of the constituents of each embodiment, the addition, deletion or replacement of other constituents is possible.

The abovementioned constituents, functions, processing portions, processing means and the like may also be implemented by means of hardware, for example by designing all or part thereof using an integrated circuit or the like. Alternatively, the abovementioned constituents, functions and the like may also be implemented by means of software, by a processor interpreting and executing programs which implement each function.

Information such as programs, tables and files with which each function is implemented may be placed on a recording apparatus such as a memory, a hard disk or an SSD (Solid State Drive), or on a recording medium such as an IC card, an SD card or a DVD.

Further, control lines and information lines are shown as considered necessary from the point of view of explanation, but from the point of view of the product, not all the control lines or information lines are necessarily shown. In practice almost all the constituents can be considered to be coupled to each other.

Further, various combinations of the constituents recited in the scope of the patent claims are possible, besides the combinations that are stated explicitly.

REFERENCE SIGNS LIST

1 Storage apparatus
2 Host computer
13 Microprocessor package
14 Memory package
130 Microprocessor
131 Local memory
141 FM board
1410 Controller
1411 Flash memory
1412 Volatile memory
121 Storing apparatus

The invention claimed is:

1. A storage system having
a storage controller and a plurality of storing apparatuses controlled by the storage controller,
wherein the storage controller is programmed to control a non-volatile cache memory, and
wherein the storage controller is programmed to:
control the non-volatile cache memory in such a way that an encryption key used to encrypt first data stored in the storing apparatuses, and an encryption key used to encrypt second data which are data corresponding to the first data and are stored in the non-volatile cache memory, are identical to each other;
determine whether the encryption key to be used with the second data can be identified or not; and when it is determined that the encryption key to be used with the second data cannot be identified, use a prescribed encryption key prepared in advance.

2. A storage system according to claim 1, wherein the storage controller is programmed, when the cache control portion receives a write request and the first data, to:
identify from the storing apparatuses a storing apparatus that is to be a storage destination of the first data,
identify an encryption key allocated to the identified storing apparatus, and
encrypt second data corresponding to the first data using the identified encryption key and stores the encrypted second data in the non-volatile cache memory.

3. A storage system according to claim 1, further comprising:
a volatile memory storing encryption key information relating to an encryption key used to encrypt the second data, from among the encryption keys used to encrypt the first data.

4. A storage system according to claim 1, wherein the storage controller is programmed to determine whether or not the encryption key to be used with the second data can be identified, depending on the type of storage destination volume of the second data.

5. A storage system according to claim 4, wherein the storage controller is programmed to:
determine if the storage destination volume of the second data corresponds, at the time of creation thereof, to a first volume mapped to the storing apparatuses or if the storage destination volume corresponds, at the time of creation thereof, to a second volume not mapped to a storage area possessed by the storing apparatuses, and
if determination is made that the storage destination volume is the first volume, encrypt the second data using an encryption key allocated to the storing apparatus mapped to the storage destination volume, and
if determination is made that the storage destination volume is the second volume, determine that the encryption key to be used with the second data cannot be identified, and use the prescribed encryption key to encrypt the second data.

6. A storage system according to claim 1, wherein if the second data have been encrypted using the prescribed encryption key and are stored in the non-volatile cache memory, then when the second data are transferred from the non-volatile cache memory to a prescribed storing apparatus, from among the storing apparatuses, in which the second data are to be stored, the storage controller is programmed to change the encryption key used for the second data from the prescribed encryption key to an encryption key used with the prescribed storing apparatus.

7. A storage system according to claim 1, wherein if the second data have been encrypted using the prescribed encryption key and are stored in the non-volatile cache memory, then when a prescribed storing apparatus in which the second data are to be stored has been ascertained, the storage controller is programmed to change the encryption key used to the second data from the prescribed encryption key to an encryption key used by the prescribed storing apparatus.

8. A storage system according to claim 3, wherein
when storing in the non-volatile cache memory the second data that have been input, the storage controller is programmed to encrypt the second data after storing the same in the volatile memory, and transfer the encrypted second data from the volatile memory to the non-volatile cache memory, and
when reading the encrypted second data from the non-volatile cache memory, the storage controller is programmed to decrypt the encrypted second data and store the same in the volatile memory, and transfer the decrypted second data from the volatile memory to the origin from which the data were read.

9. A storage system according to claim 1, further comprising:
a volatile memory storing prescribed key management information which designates in advance and manages the prescribed encryption keys for each cache segment of the non-volatile cache memory.

10. A storage system according to claim 1, wherein the storage controller is programmed, when receiving a read request, to:
identify from the storing apparatuses a storing apparatus in which the first data corresponding to the read request are stored,
identify an encryption key used by the identified storing apparatus,
decrypt using the identified encryption key the second data corresponding to the first data, and
transfer the decrypted second data to the issuer of the read request.

11. A storage system according to claim 10, wherein the storage controller is programmed, upon determining that the second data corresponding to the first data are not stored in the non-volatile cache memory, to
read the first data from the storing apparatus in which the first data are stored,
store the first data that have been read, in the non-volatile cache memory, as the second data, without modification,
identify an encryption key used by the storing apparatus in which the first data are stored,
decrypt using the identified encryption key the second data which have been stored in the non-volatile cache memory, and
transfer the decrypted second data to the issuer of the read request.

12. A storage system according to claim 1, further comprising a volatile memory storing:
cache key management information for managing information for identifying an encryption key used to encrypt the second data stored in the non-volatile cache memory, and information indicating a storage destination of the second data, and
key management information which manages data for all encryption keys that can be used in the storage apparatus and the storing apparatuses to which the keys are allocated.

13. A cache control apparatus for a storage system having a plurality of storing apparatuses, the cache control apparatus comprising:
a non-volatile cache memory, and
a volatile memory which stores encryption key information relating to an encryption key used to encrypt second data which are data corresponding to the first data and are stored in the non-volatile cache memory, from among the encryption keys used to encrypt the first data stored in the storing apparatuses,
wherein the cache control apparatus is programmed to:
perform control using the encryption key information such that the encryption key used to encrypt the first data and the encryption key used to encrypt the second data are identical to each other, determine whether the encryption key to be used with the second data can be identified or not, and when it is determined that the encryption key to be used with the second data cannot be identified, use a prescribed encryption key prepared in advance.

14. A cache control method for a storage system having a plurality of storing apparatuses, the cache control method comprising:

implementing control in such a way that an encryption key used to encrypt first data stored in the storing apparatuses, and an encryption key used to encrypt second data which are data corresponding to the first data and are stored in the non-volatile cache memory, are identical to each other; and if a write request and the first data are received, identifying a storing apparatus that is to be the storage destination of the first data from among the storing apparatuses;

identifying an encryption key allocated to the identified storing apparatus;

encrypting second data corresponding to the first data using the identified encryption key and storing the encrypted second data in the non-volatile cache memory;

determining whether the storing apparatus that is to be the storage destination of the first data can be identified or not; and if determination is made that the storing apparatus that is to be the storage destination of the first data cannot be identified, encrypting the second data using a prescribed encryption key which has been prepared in advance, and storing the encrypted second data in the non-volatile cache memory.

15. A cache control apparatus according to claim 13, wherein the cache control apparatus is programmed to:

determine whether or not the encryption key to be used with the second data can be identified, depending on the type of storage destination volume of the second data;

determine if the storage destination volume of the second data corresponds, at the time of creation thereof, to a first volume mapped to the storing apparatuses or if the storage destination volume corresponds, at the time of creation thereof, to a second volume not mapped to a storage area possessed by the storing apparatuses, and if determination is made that the storage destination volume is the first volume, encrypt the second data using an encryption key allocated to the storing apparatus mapped to the storage destination volume, and if determination is made that the storage destination volume is the second volume, determine that the encryption key to be used with the second data cannot be identified, and use the prescribed encryption key to encrypt the second data.

16. A cache control apparatus according to claim 13, wherein the cache control apparatus is programmed:

if the second data have been encrypted using the prescribed encryption key and are stored in the non-volatile cache memory, then when the second data are transferred from the non-volatile cache memory to a prescribed storing apparatus, from among the storing apparatuses, in which the second data are to be stored, to change the encryption key used for the second data from the prescribed encryption key to an encryption key used with the prescribed storing apparatus.

17. A cache control apparatus according to claim 13, wherein the cache control apparatus is programmed:

if the second data have been encrypted using the prescribed encryption key and are stored in the non-volatile cache memory, then when a prescribed storing apparatus in which the second data are to be stored has been ascertained, to change the encryption key used to the second data from the prescribed encryption key to an encryption key used by the prescribed storing apparatus.

18. A cache control method according to claim 14, further comprising:

determining whether or not the encryption key to be used with the second data can be identified, depending on the type of storage destination volume of the second data;

determining if the storage destination volume of the second data corresponds, at the time of creation thereof, to a first volume mapped to the storing apparatuses or if the storage destination volume corresponds, at the time of creation thereof, to a second volume not mapped to a storage area possessed by the storing apparatuses, and if determination is made that the storage destination volume is the first volume, encrypting the second data using an encryption key allocated to the storing apparatus mapped to the storage destination volume, and if determination is made that the storage destination volume is the second volume, determining that the encryption key to be used with the second data cannot be identified, and using the prescribed encryption key to encrypt the second data.

19. A cache control method according to claim 14, further comprising:

if the second data have been encrypted using the prescribed encryption key and are stored in the non-volatile cache memory, then when the second data are transferred from the non-volatile cache memory to a prescribed storing apparatus, from among the storing apparatuses, in which the second data are to be stored, changing the encryption key used for the second data from the prescribed encryption key to an encryption key used with the prescribed storing apparatus.

20. A cache control method according to claim 14, further comprising:

if the second data have been encrypted using the prescribed encryption key and are stored in the non-volatile cache memory, then when a prescribed storing apparatus in which the second data are to be stored has been ascertained, changing the encryption key used to the second data from the prescribed encryption key to an encryption key used by the prescribed storing apparatus.

* * * * *